(12) United States Patent
Rinko

(10) Patent No.: US 7,565,054 B2
(45) Date of Patent: Jul. 21, 2009

(54) ULTRA THIN LIGHTING ELEMENT

(75) Inventor: Kari Rinko, Helsinki (FI)

(73) Assignee: Oy Modilis Ltd., Helsinki (FI)

( * ) Notice: Subject to any disclaimer, the term of this patent is extended or adjusted under 35 U.S.C. 154(b) by 0 days.

(21) Appl. No.: 11/118,341

(22) Filed: May 2, 2005

(65) Prior Publication Data

US 2005/0259939 A1 Nov. 24, 2005

Related U.S. Application Data

(60) Provisional application No. 60/566,601, filed on Apr. 30, 2004.

(51) Int. Cl.
*G02B 6/10* (2006.01)
*G01D 11/28* (2006.01)

(52) U.S. Cl. .............. 385/146; 362/26; 362/29

(58) Field of Classification Search ............. None
See application file for complete search history.

(56) References Cited

U.S. PATENT DOCUMENTS

| | | | |
|---|---|---|---|
| 5,105,568 A | 4/1992 | Branning | |
| 5,122,890 A | 6/1992 | Makow | |
| 5,299,109 A | 3/1994 | Grondal | |
| 5,428,912 A | 7/1995 | Grondal et al. | |
| 5,481,440 A | 1/1996 | Oldham et al. | |
| 5,506,929 A | 4/1996 | Tai et al. | |
| 5,542,201 A | 8/1996 | Grondal et al. | |
| 5,703,667 A | 12/1997 | Ochiai | |
| 5,742,433 A | 4/1998 | Shiono et al. | |
| 5,748,106 A | 5/1998 | Schoenian et al. | |
| 5,761,540 A | 6/1998 | White | |
| 5,892,599 A | 4/1999 | Bahuguna | |
| 5,967,637 A | 10/1999 | Ishikawa et al. | |
| 6,011,602 A * | 1/2000 | Miyashita et al. | 349/65 |
| 6,036,328 A | 3/2000 | Ohtsuki et al. | |
| 6,144,480 A | 11/2000 | Li et al. | |
| 6,151,166 A | 11/2000 | Matsushita et al. | |
| 6,158,867 A * | 12/2000 | Parker et al. | 362/29 |
| 6,196,691 B1 | 3/2001 | Ochiai | |

(Continued)

FOREIGN PATENT DOCUMENTS

EP 1016817 A1 7/2000

(Continued)

OTHER PUBLICATIONS

Forms PCT/ISA/220, PCT/ISA/210 and PCT/ISA/237.

*Primary Examiner*—Sung H Pak
*Assistant Examiner*—Hoang Tran
(74) *Attorney, Agent, or Firm*—Venable LLP; Eric J. Franklin

(57) ABSTRACT

An ultra thin lighting element including at least one light source. A lightguide element includes one lightguide layer comprising a plurality of discrete fine optic surface relief structures on at least one portion of at least one surface. Each surface relief structure includes basic structural features on the order of about 10 microns or less in height, and on the order of about 10 microns or less in each lateral dimension. The number, arrangement and size of each surface relief structure and height and lateral dimensions of the structural features of the surface relief structures being varied to provide a desired degree of outcoupling modulation of light incoupled into the light guide element.

38 Claims, 25 Drawing Sheets

U.S. PATENT DOCUMENTS

| | | |
|---|---|---|
| 6,199,995 B1 | 3/2001 | Umemoto et al. |
| 6,247,826 B1 | 6/2001 | Funamoto et al. |
| 6,396,409 B1 | 5/2002 | Yeh |
| 6,598,987 B1 * | 7/2003 | Parikka ..................... 362/26 |

FOREIGN PATENT DOCUMENTS

| | | |
|---|---|---|
| FI | 1533 | 6/1994 |
| FI | 98768 | 4/1995 |
| FI | 1991732 | 6/2000 |
| WO | WO 99/09349 A1 | 2/1999 |
| WO | WO 03/001255 A2 | 1/2003 |
| WO | WO 03/004931 A2 | 1/2003 |
| WO | WO 03/010560 A2 | 2/2003 |

* cited by examiner

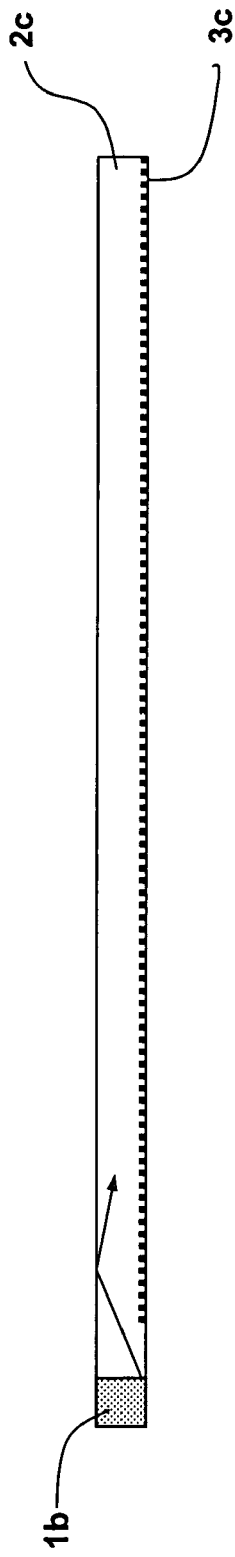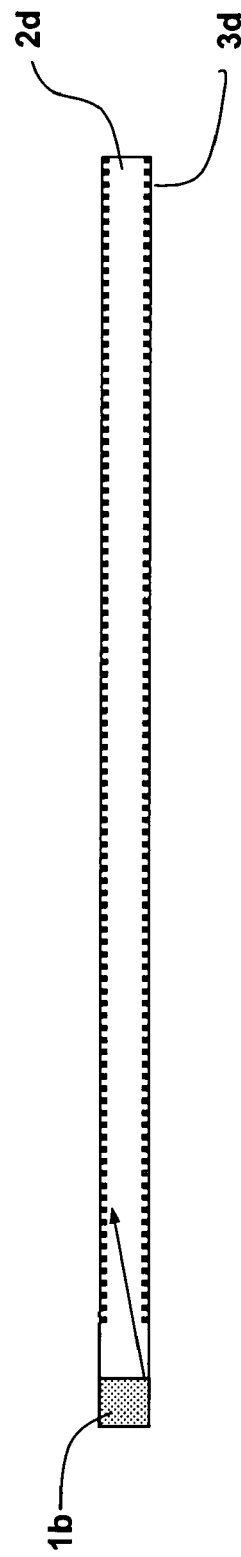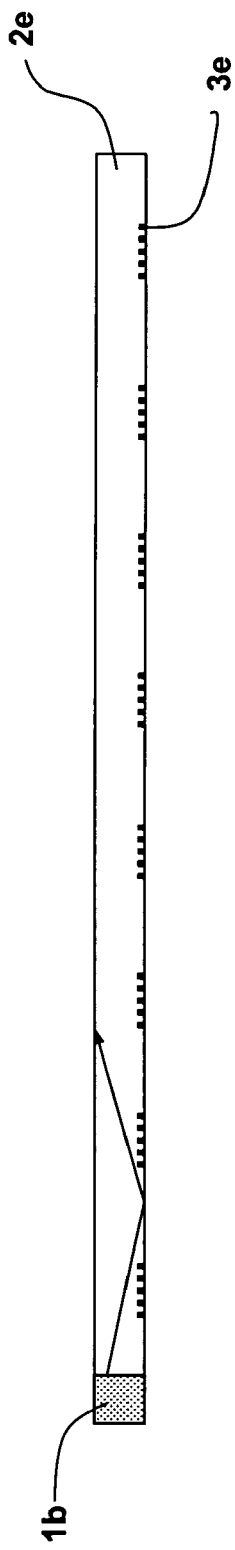

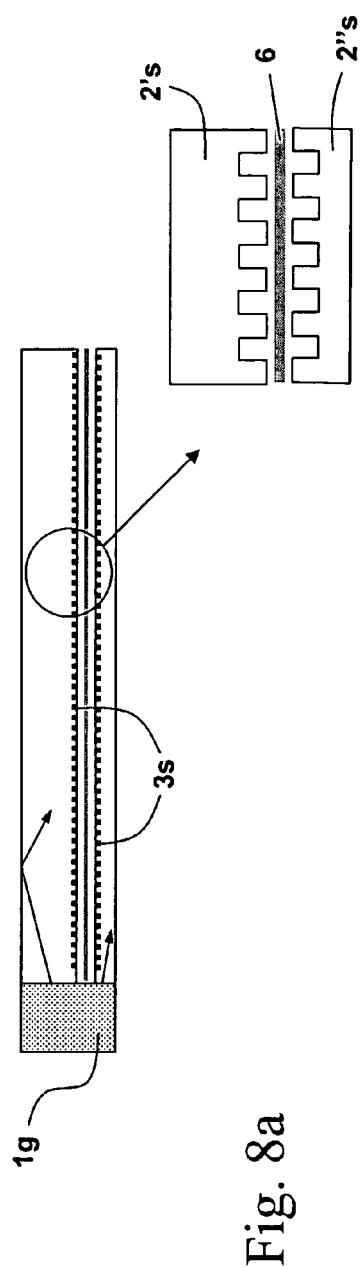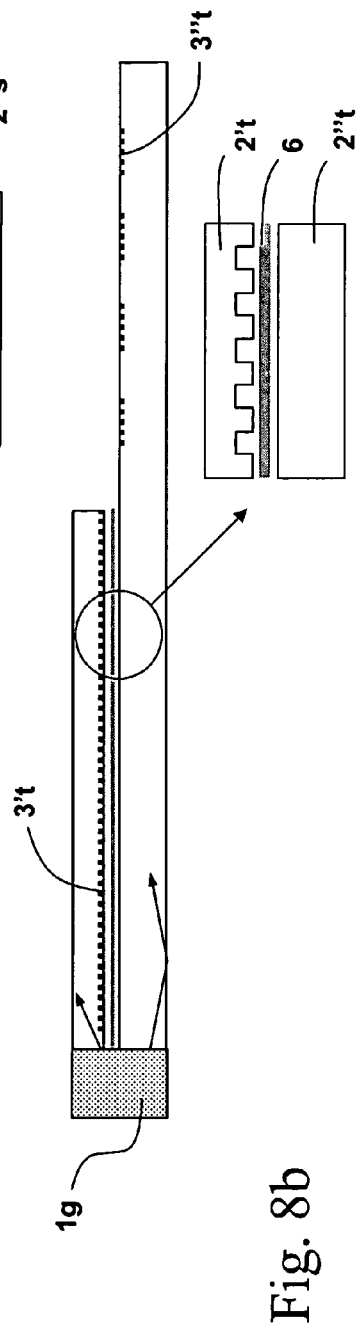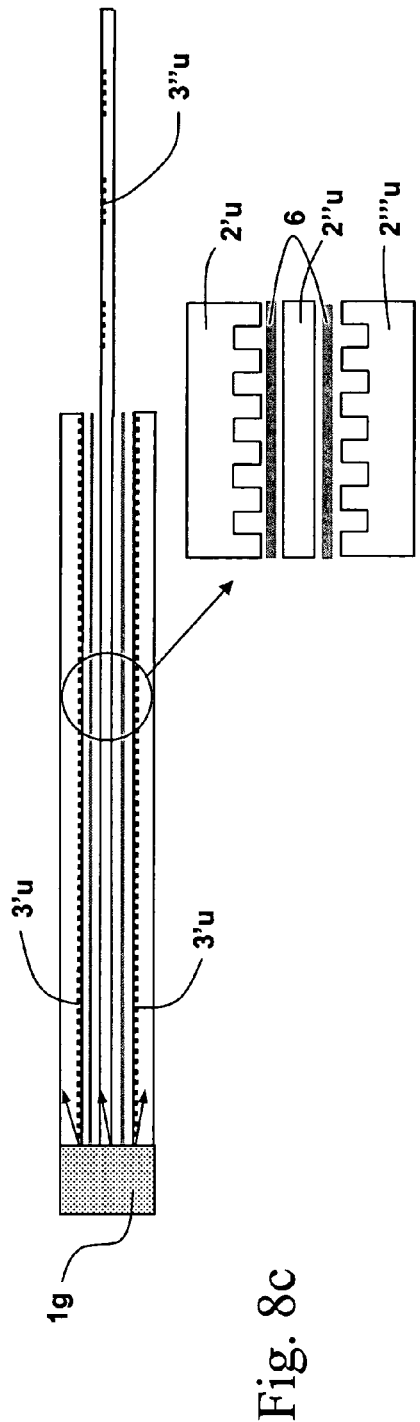

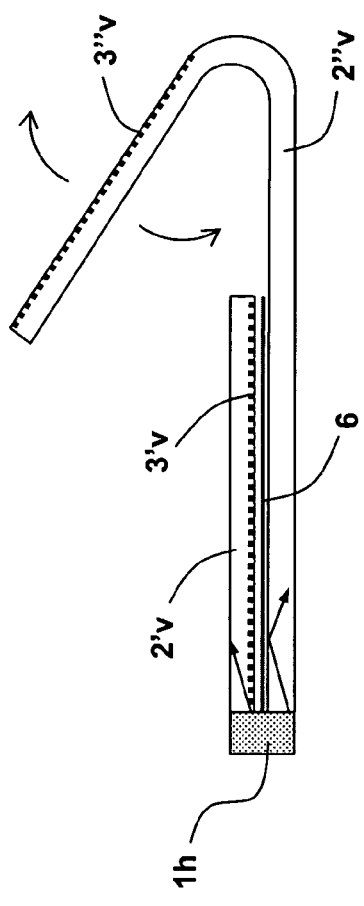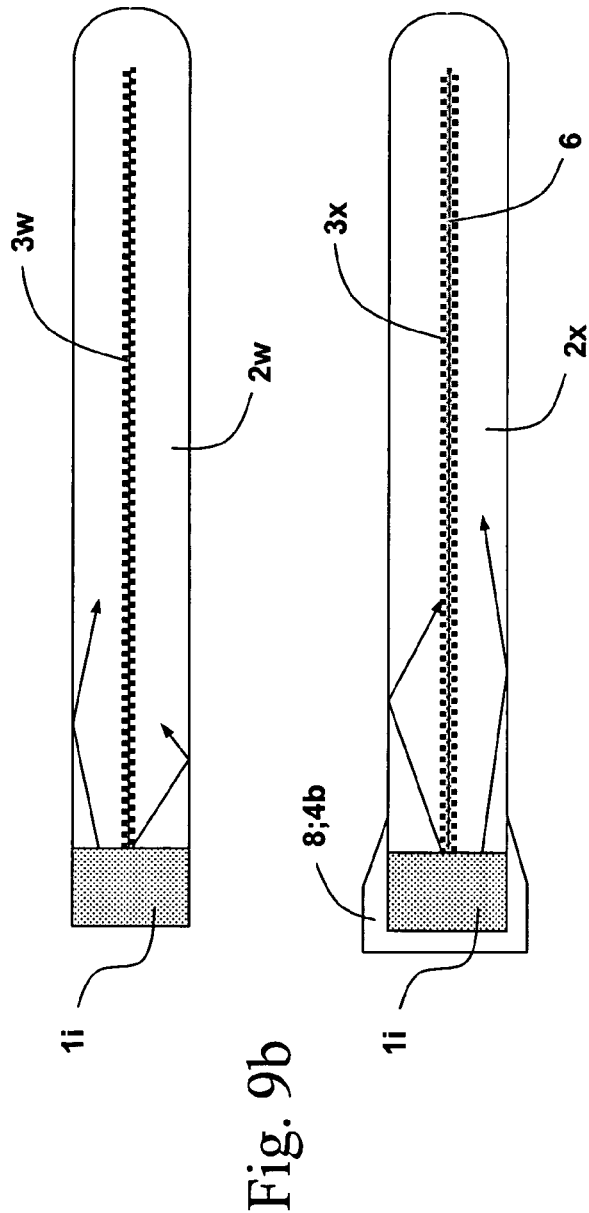
Fig. 9a  Fig. 9b  Fig. 9c

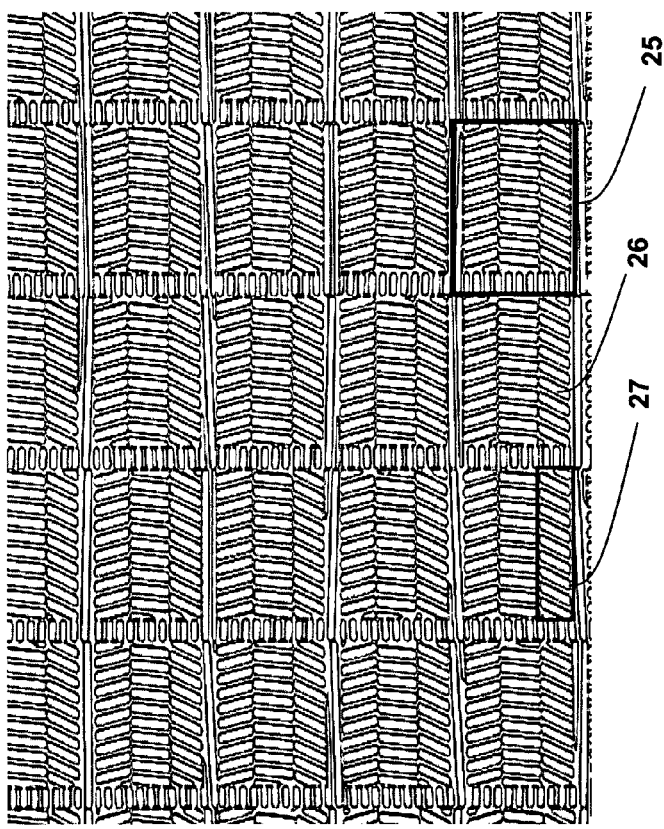
Fig. 17a
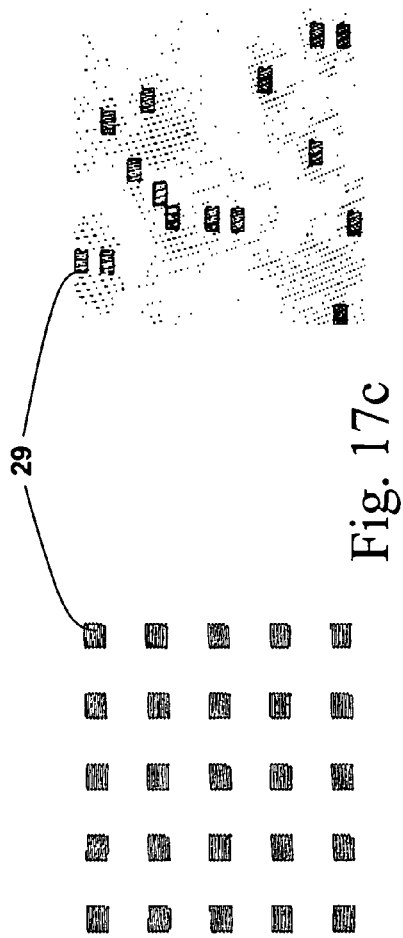
Fig. 17c
Fig. 17b

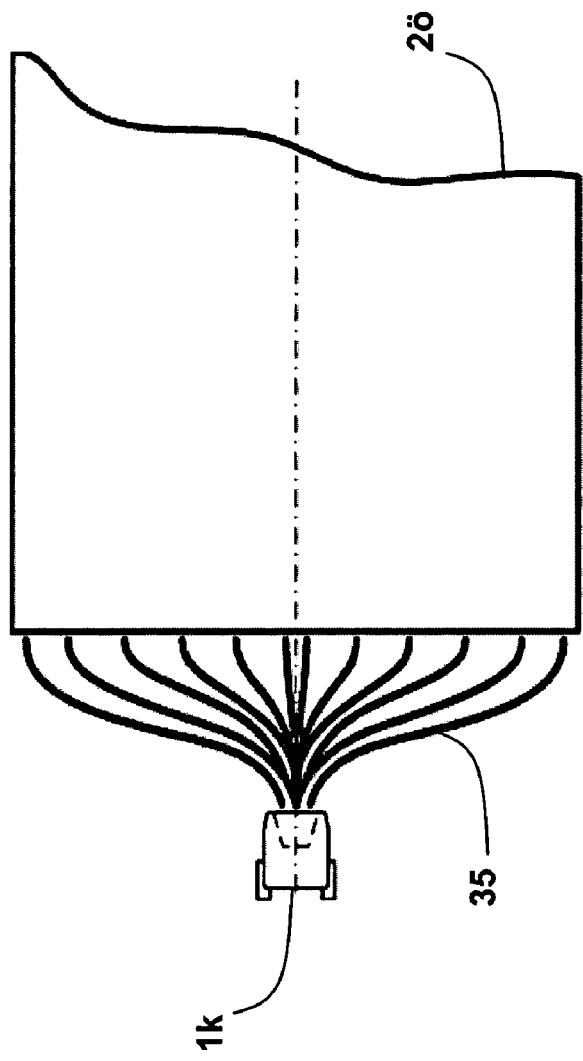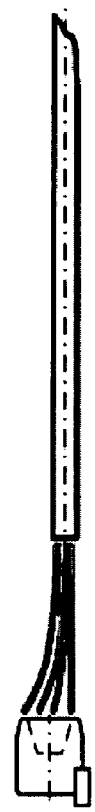
Fig. 20a
Fig. 20b

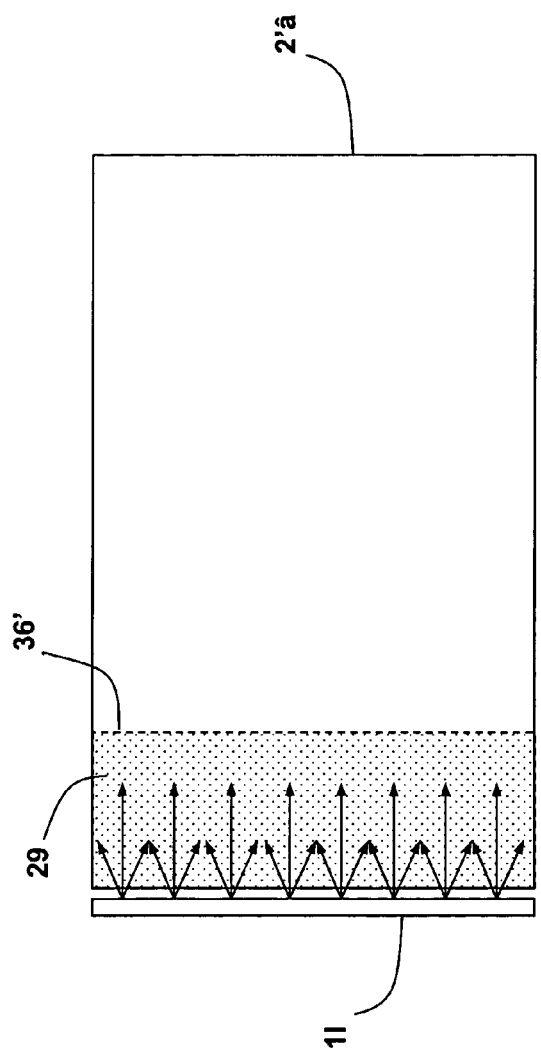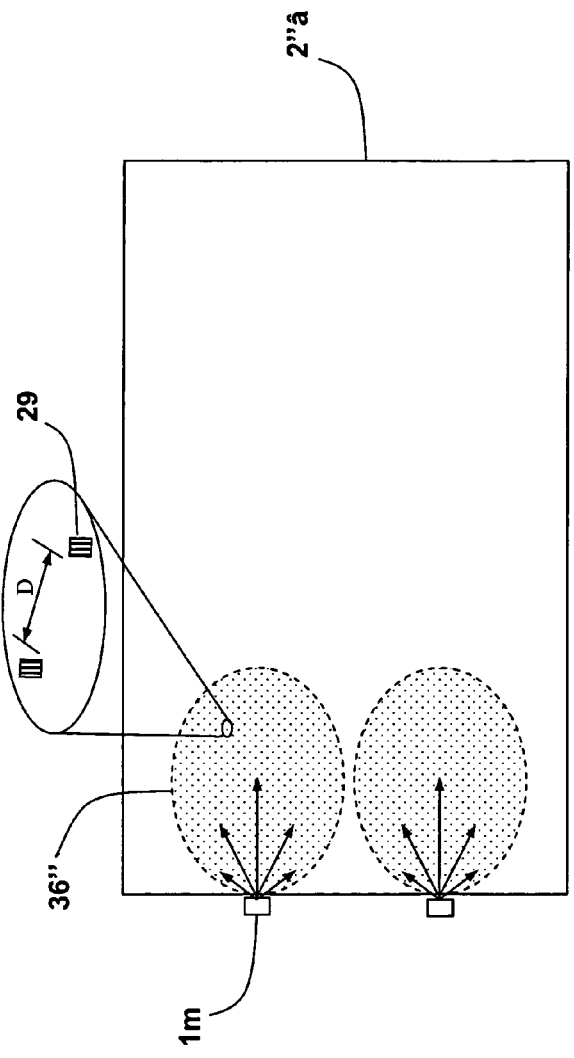
Fig. 21a
Fig. 21b

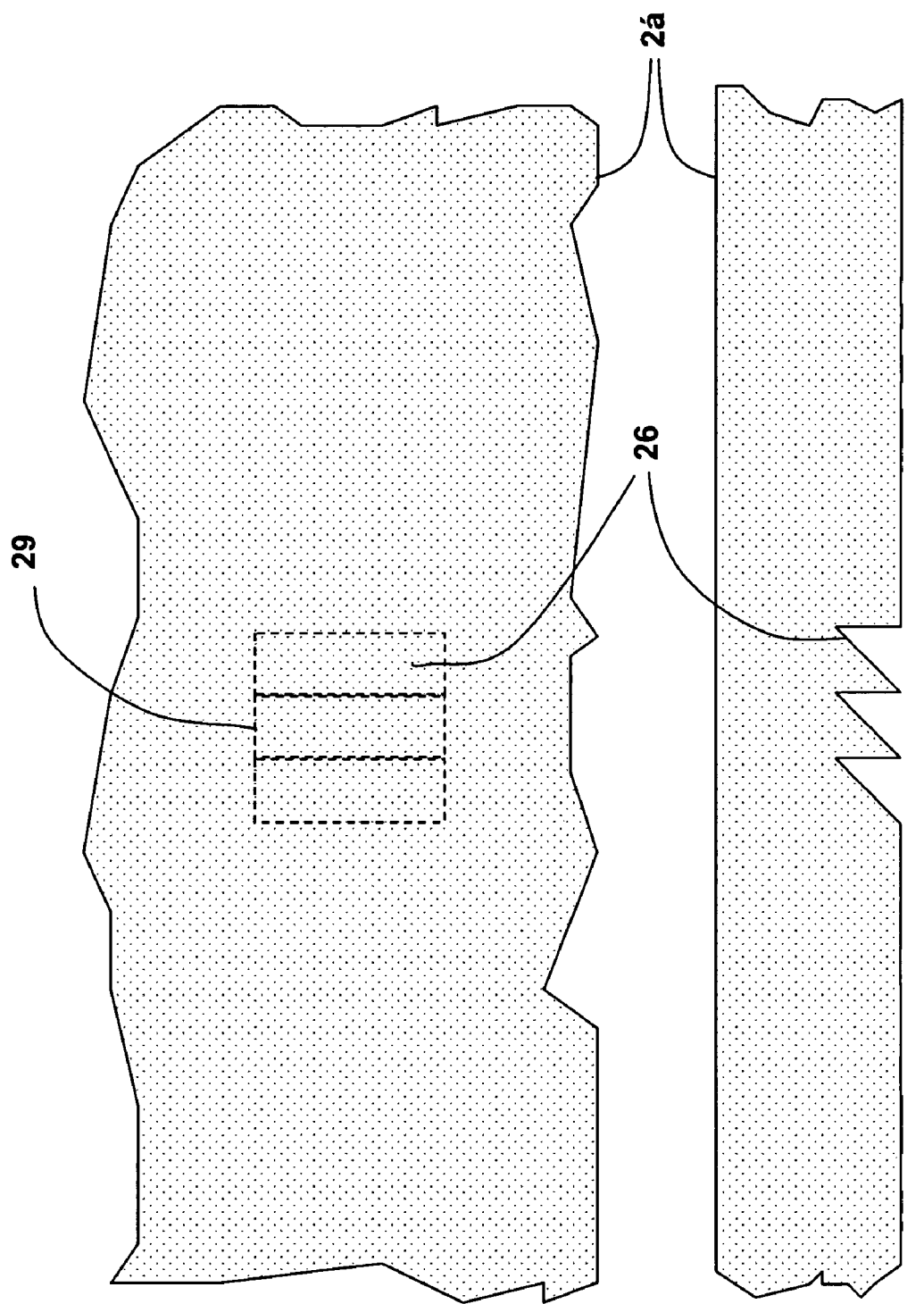

ULTRA THIN LIGHTING ELEMENT

RELATED APPLICATIONS

This application claims priority from U.S. provisional application Ser. No. 60/566,601, filed Apr. 30, 2004.

FIELD OF THE INVENTION

The present invention relates to lightguides for guiding light from light sources in lighting solutions. The lightguides may include ultra thin lightguide layers and multi-layer applications. Additionally, the present invention includes lighting elements that include the lightguides and lighting solutions. The present invention also relates to manufacturing methods. The lightguides and lighting elements can be used for display lighting (e.g. backlighting, frontlighting), interior lighting and exterior lighting, among other applications.

SUMMARY OF THE INVENTION

An ultra thin lighting element is provided. The lighting elements includes at least one light source. A lightguide element includes one lightguide layer comprising a plurality of discrete fine optic surface relief structures on at least one portion of at least one surface. Each surface relief structure includes basic structural features on the order of about 10 microns or less in height, and on the order of about 10 microns or less in each lateral dimension. The number, arrangement and size of each surface relief structure and height and lateral dimensions of the structural features of the surface relief structures being varied to provide a desired degree of outcoupling modulation of light incoupled into the light guide element.

Further objectives and advantages, as well as the structure and finction of exemplary embodiments will become apparent from a consideration of the description, drawings, and examples.

BRIEF DESCRIPTION OF THE DRAWINGS

The foregoing and other features and advantages of the invention will be apparent from the following, more particular description of an exemplary embodiment of the invention, as illustrated in the accompanying drawings wherein like reference numbers generally indicate identical, functionally similar, and/or structurally similar elements.

FIGS. 2a, 2b, and 2c represent illustrations showing cross-sectional views of various embodiments of ultrathin lighting elements according to the present invention;

FIGS. 8a, 8b, and 8c represent illustrations showing cross-sectional views of embodiments of lighting elements according to the present invention that include lightguide elements including two or more lightguide layers, optionally in various regions, and including various optical relief structures optionally on various surfaces on various surfaces and optionally various films arranged between the layers;

FIG. 9a represents an illustration showing a cross-sectional view of an embodiment of a lighting element according to the present invention wherein a portion of the lightguide element includes two lightguide layers and a bendable lightguide layer;

FIGS. 9b and 9c represent illustrations showing cross-sectional views of embodiments of a lighting elements according to the present invention that include a single lightguide layer bent to form a two layer lightguide element;

FIGS. 17a, 17b and 17c represent illustrations showing overhead views of embodiments of lightguide layers according to the present invention;

FIGS. 20a and 20b represent illustrations showing, respectively, an overhead view and a side view of an embodiment of a lighting element according to the present invention where the incoupling structure includes optic fibers;

FIGS. 21a and 21b represent illustrations showing overhead views of lightguide elements according to the present invention including surface relief structures in different groupings in a region of the lightguide layer in the vicinity of the light sources;

FIGS. 22a and 22b represent illustrations showing an overhead view and a cross-sectional view of an embodiment of a lightguide layer wherein the basic structural features of the surface relief structures form a small discrete outcoupling structure groups;

DETAILED DESCRIPTION OF EMBODIMENTS OF THE INVENTION

Figure 1A:
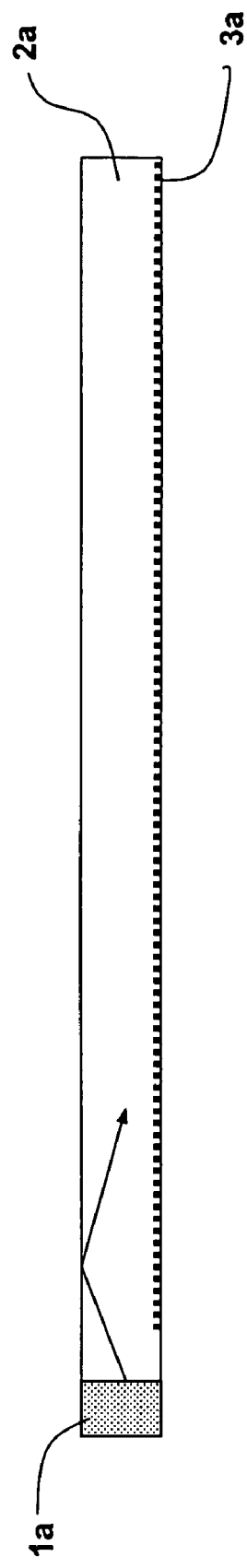
FIGS. 1a and 1b represent illustrations showing cross-sectional views of two embodiments of known lightguide structures.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

The present invention provided a lighting element that includes a lightguide element. The lightguide element includes at least one lightguide layer. The lightguide layer(s) may be made of a variety of different materials. Typically, any optically clear material may be utilized. Examples of materials that may be utilized include PMMA, PC, PET and other polymers. The materials may be clear UV or thermal cured.

Circuitry, electrical contacts, printed figures or masks may be applied on one or more lightguide layers.

The at least one lightguide layer includes a plurality of discrete fine optic surface relief structure groups on at least one portion of at least one surface. The surface relief structure group may be provided on at least a portion of each side of each lightguide layer. Each surface relief structure group is made up of basic structural features. The structural features can include (discrete or non-continuous) grooves having various cross-sections, such as different cross-sectional wave forms. The surface relief structures may include diffractive and/or refractive structures. The structural features can have any cross-sectional shape such that they can outcouple light from the lightguide layer. The outcoupling from group to group may be the same, such as with a keypad. On the other hand, the outcoupling of each group may be different. It may even be desirable to vary the outcoupling of one group at different locations in the group.

The structural features can have any cross-sectional shape such that they can outcouple light from the lightguide layer. For example, the optic surface relief structure for light outcoupling is typically a fine grating structure. The grating profile can be binary, blazed, slanted and sinusoidal or hybrid, among other shapes. The light outcoupling structure of lightguide layer can be designed in order to form uniform illumination on the whole surface or discrete illumination in the preferred areas with preferred shape. The grating structures can be optimised in order to achieve high outcoupling efficiency in 0° angle (collimated light) utilizing, for example, blazed type grating.

The surface relief structures may be arranged over the entire surface or substantially the entire surface of a lightguide layer. Alternatively, the surface relief structures may be confined to all of one region of a lightguide layer. In some embodiments, the surface relief structures are confined to certain regions of the at least one lightguide layer. The regions may be regularly or irregularly arranged on any lightguide layer. The desired degree of outcoupling may affect the arrangement of the surface relief structures. The proximity to the light source(s) may also affect the arrangement of the surface relief structures. For example, a region of the lightguide layer in the vicinity of the at least one light source the outcoupling structure groups comprise about 10% or less of the area of the lightguide layer.

Each surface relief structure includes basic structural features. The dimensions of the basic features may depend upon the desired degree of outcoupling and the wavelengths of light being utilized. Typically, the basic features are on the order of about 10 microns or less in height, and on the order of about 10 microns or less in each lateral dimension. More typically, the basic features are on the order of less than about 10 microns in height, and on the order of less than about 10 microns in each lateral dimension.

Figures 24A, 24B:
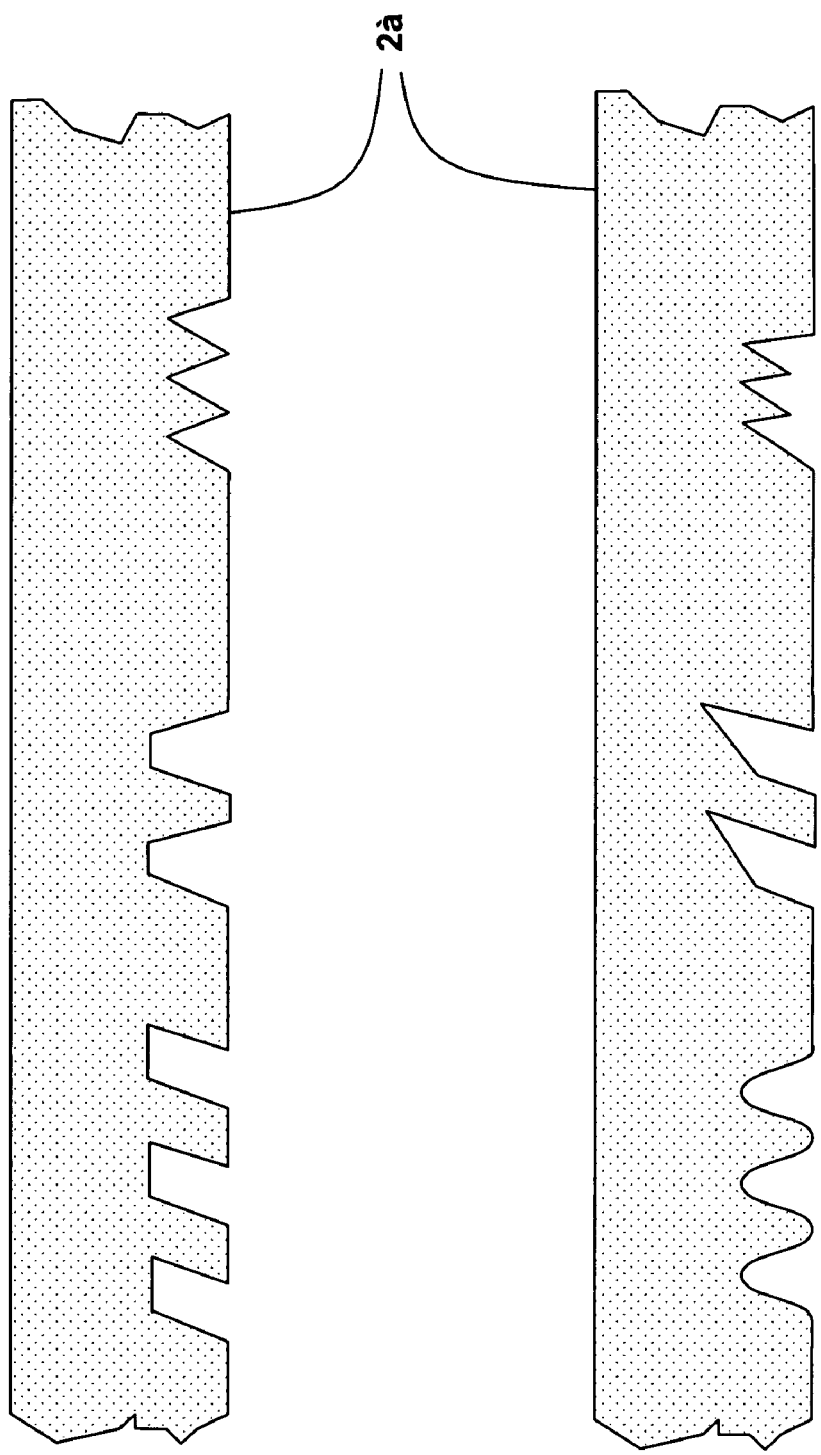
FIGS. 24a and 24b represent illustrations showing cross-sectional views of various embodiments of basic structural features of surface relief structures according to the present invention.

FIGS. 24a and 24b represent illustrations showing cross-sectional views of various embodiments of basic structural features of surface relief structures according to the present invention. These shapes represent only a few examples of the cross-sectional shapes that the basic structural elements may have. Any lightguide layer may include anyone or more of these shapes in any region of surface relief structures. To facilitate the understanding of these features, the features are illustrated in a few discrete groups. As is apparent from the discussion herein, the surface relief structures may be provided anywhere on any lightguide layer.

The lightguide element may include more than one lightguide layer. If the lighting element includes more than one lightguide layer, the lightguide layers may have the same cross-sectional area. Alternatively, the lightguide layers may have different cross-sectional areas. The number of lightguide layers may vary over the lightguide element. The thickness of the single lightguide layer may be about 0.01 mm to about 0.4 mm. The lightguide element may have a thickness similar to the height of the light source.

The entire lightguide element may be planar. At least a portion of one or more of the lightguide element may be flexible and/or bendable. The bend may be permanent or the lightguide element may be bent during use. The lightguide is flexible in the sense that light can still be propagated through it and outcoupled out of it on either side of curve or bend. If the lightguide element includes more than one lightguide layer, one or more the lightguide layers may be bendable and/or flexible. When at least a portion of the lightguide element is curved, the angle of the curve typically does not exceed a total reflection angle.

If the lightguide element includes more than one lightguide layer, one or more films may be arranged at least a portion of any region between overlying two lightguide layers. A variety of different films may be arranged between lightguide layers. For example, the film can include one or more of reflector film, diffuser film, prismatic film and brightness enhancement film, in order to form different lighting performances.

At least one light source produces light that is introduced into the lightguide element. The light source could include an LED or other suitable light source. The light is incoupled into the lightguide element. The light source could be connected directly to the lightguide element and directly introduce light into the lightguide element. Alternatively, the lighting element may be arranged with one or more incoupling structures. The incoupling structure may include a wedge including specular reflectors on at least one of a top and bottom surface, an elliptical light pipe, a focusing lens and/or a bundle of split optic fibers. The light source and the incoupling structure may be a unitary structure. Where the lightguide element includes multiple lightguide layers, the incoupling may vary among the layers. Some embodiments of the incoupling structure may include a slanted, a blazed or a radial binary grating structure with or without diverging lens.

The present invention provides great advantages over known lightguide structures, particularly in terms of providing a thin and flexible structure. For example, an ultra thin lightguide, which requires less space. This can be a very important issue especially in hand held products such as mobile phones, watches, but also in other display, keypad, console and lighting solutions.

Embodiments of a thin, flexible lightguide according to the invention that can be bent can allow making interesting applications, such as flexible and/or curved displays, flexible phones, clam shell mobile phones (flip-phones). Embodiments of the present invention that include multiple lightguide layers offer the ability to easily control light incoupling/outcoupling and other optical performances, in each layer. Two or more lightguide layers can be stacked on top of another. Reflector and/or films can be utilized between these.

Light may be incoupled into the lightguide layers in proportion to layer thickness. Along these lines, thickness typically incouples less light, whereas more thickness typically incouples more light. This can provide a very easy way to control the light incoupling and can also distribute the light to different lightguide layers. This concept is suitable for dual backlights, backlights with keypad lighting, dual backlights with keypad lighting, among other structures.

The total thickness of the lightguide stack-up can be the same as the height of the LED. For example, according to one embodiment, the LED has a height of about 0.8 mm.

The present invention may include a centralized light source arrangement. This typically requires less light sources (e.g. LEDs), less assembly costs and less space. Embodiments of the present invention that include multi-layer lightguide layers can utilize light sources that are placed on only one edge of the lightguide stack up. All lightguide layers may propagate light to the right area, in order to be illuminated.

Embodiments of the present invention can provide practical variability in the size of the lightguide and the amount of light sources. This can provide more flexibility to utilize the same lightguide design in different applications. The lightguide design may be formed for a specific size with a specific optical diffusing structure or light directing structure in the first (light incoupling) part, which is in the vicinity of the light source(s), which is not dependent on precise light source (e.g. LED) placement. This type of optical design can allow the use of different amounts of light sources, while having the minimum quantity of light sources and maximum quantity of light sources on the same edge. This can permit achieving higher or lower brightness with the same uniformity performance. Additionally, the same lightguide design can be cut to different sizes in order to achieve the same performance in uniformity.

The present invention can provide extremely cost-effective production. For example, the surface relief structure may be formed by means of a continuous roll replication process (roll-to-roll process). This method offers extremely fast production, with high optical product quality.

Conventional thin lightguides typically have a thickness of about 0.8 to about 1.0 mm and typically include microlens or microstructures. Such conventional microstructures, such on the order of about 15 microns in height or more, and on the order of about 50 microns or more in one lateral dimension, cannot be utilized in thin flexible lightguides for a variety of reasons. For example, these optical structures are unable to function properly with large incidence angles. Additionally, these optical structures have a limited degree of modulation, to achieve uniform light outcoupling distribution in thin lightguide solution. Furthermore, conventional production methods, such as injection molding, can cause problems with optical quality in thin lightguide solutions.

Preferred embodiments of the present invention can provide an ultra thin lightguide (film-like) solution with a single layer thickness of about 0.4—about 0.01 mm. Embodiments of the present invention can include lightguides with single layer and multilayer solutions. All layers may have surface relief structures, which may be formed on the surface in order to achieve different optical functions. These optical structures can be diffractive and/or refractive having different profiles such as binary, slanted, blazed, and sinusoidal, etc., forming different light outcoupling groups or sub-groups.

Multilayer lightguide elements according to the present invention may have a thickness that may be matched by the height of the light source. For example, if the light source includes an LED, the LED may have a height of about 0.8 mm, the lightguide element may include multiple lightguide layers and a reflector arranged between the layers may have a height of about 0.8 mm. The light incoupling and luminance (brightness) may be controlled by varying the thickness of each lightguide layer. For example, light from the light source may incoupled into the lightguide layers in proportion to layer thickness. Along these lines, less thickness=less light incoupling and less brightness, more thickness=more light incoupling and more brightness. This is a very simple way to control the light incoupling and distributes the light to the different lightguide layers, permitting a controlled and desired brightness to be realized in each of the lightguide layers.

The lightguide layers according to the present invention may be manufactured according to a number of different processes. Thin lightguide layer production is preferably completed by means of continuous roll replication, or roll-to-roll replication. Using this fast, cost-effective manufacturing method bulk material, such as optically clear plastic film, can be utilized in surface relief replication. These different well know roll-to-roll methods are well known and well sophisticated to manufacture surface relief structures, either refractive or diffractive for many different applications. There are several published material and many companies having patented roll-to-roll methods available, such as Reflexite, Avery Dennison, 3M, Epigem, Rolltronics, Polymicro, Printo project, among others. Additionally, high quality replicated optical structures can be achieved.

Other suitable production methods can include continuous or discrete casting methods (UV or thermal curing), compression molding, continuous or discrete embossing, such as hard embossing, soft embossing and UV embossing, among others. Melt film can also be used. Although many manufacturing processes may be utilized, some may be particularly suitable to manufacturing particular embodiments. For example, blazed type structural profiles may be best manufactured by means of roll-to-roll UV-embossing or a melt film method, in order to achieve accurate and high quality replication.

Other functional films, such as reflector films, can be laminated onto the surface of lightguide during the same roll-to-roll production method. Also, any kind of figures and mask can be printed or laminated on the lightguide layer including electrical contact and circuitries. This can be a crucial cost issue.

After the surface relief structures are formed, the lightguide layers can be cut to preferred shapes directly from a roll or film by means of laser, die cutting and/or other means. Also, optical features can be manufactured during the cutting process. Such optical features particularly include narrow boundary lines, which can be reflecting or directing light for the preferred area, or directing/diffusing light in the first part of lightguide. This cutting process can be completed in the roll-to-roll process with very short unit times and costs.

Injection molding as a production method may make it difficult to manufacture ultra thin lightguides in sizes larger than about 10"/15". The reason for this is that fine optic structures, such as surface relief structures on the order of about 15 microns and less, may be difficult to replicate totally/ perfectly and at the same time achieve a high quality yield.

The optical structure, or surface relief structure, of a thin lightguide typically requires a high and increased degree of modulation to achieve the uniform light outcoupling distribution, or brightness. The optical basic structure typically must be very fine, such as on the order of smaller than about 10 microns or less in height, and on the order of about 10 microns or less in one lateral dimension, in order to achieve the desired degree of modulation. This makes it possible to form small discrete outcoupling structure groups and control the proportion of outcoupling structures on the lightguide layer more accurately. Preferably, in thin lightguide layers, the optical structures are arranged in small discrete outcoupling structure groups, wherein a region of the lightguide layer in the vicinity of the at least one light source the outcoupling structure groups comprise about 10% or less of the area of the lightguide layer. In this region the maximum distance between small discrete outcoupling structure groups is 300 microns or less. This region may be the most crucial part of the lightguide structural design, because an intensity of incoupled light can be 50% or more of maximum intensity.

Conventional microstructure solutions that are based on bigger and higher optical details, typically have difficulties in thin lightguides in order to achieve uniform brightness.

Embodiments of a lightguide element according to the present invention can be flexible. In some cases, less than all lightguide layers of a lightguide element may be flexible. Embodiments of the invention including a flexible lightguide element can be bent into a desired form. Such embodiments can be flexible and curved (bent) for preferred form in order to fulfill total reflection theory and not exceeding the total reflection angle.

A thin lightguide can help to prevent light leakage, because light beams typically hit the optical structure more times than in a thicker lightguide. The total light can be outcoupled more efficiently, causing less light leakage at the end of the lightguide.

Ultra thin lightguides can be used as a single layer with or without other optic films (reflector, diffusers, brightness enhancement films). Thin lightguide layer can have fine optical structures, either on one side or both sides of the layer.

In order to use only one lightguide layer, a conventional LED may be adapted to the lightguide layer with a specific optical component or adapter, which helps to incouple light into a thin lightguide layer. For example, the LED height may be 0.8 mm as compared to a lightguide layer having a thickness of about 0.2 mm. This LED optical component or adapter could be, for example, a wedge-type solution with specular reflectors on the top and bottom. Other incoupling structures that may be utilized can include a thin elliptical light pipe, a focusing lens or a bundle of split optic fibers. Also, LEDs with circuitry can be in-molded into this adapter. This can make it easier to handle them. This adapter can contain snap structures in order to connect it to the lightguide layer easily. This adapter can be made of either rigid or flexible optical material.

Process methods for forming the adapter can be, for example, casting or injection molding. Light incoupling may be completed with specific grating structures on the bottom or on the top surface. For example, a slanted, a blazed or radial binary grating structure may be utilized with or without a diverging lens.

Ultra thin lightguide elements can be constructed with two or more layers. Lightguide layers can form, for example, a dual backlight solution, backlight and keypad lighting solution, dual backlight and keypad lighting solution. For dual backlight solution, only one reflector film between lightguide layers may be required. This can cut costs and makes the package thinner and easier to handle and assemble. In a solution that includes two layers, the optical outcoupling structures can be arranged in the center line of the lightguide solution (inner surfaces of lightguide layers), because the major part of incoupled light may be propagated along a center line. In the words, the majority of light may be propagated at high incidence angles.

One or more lightsources may be arranged to provide light that is introduced into the lightguide element. According to some embodiments, all light sources can be placed on the one edge of a lightguide element for light incoupling into the lightguide layers. This centralized light source arrangement may reduce the amount of needed light sources and remove the need for a light source multi-assembly. This can have a direct influence on total cost reductions.

One preferred application is the backlight and keypad combination, where a centralized LED arrangement can be used on the edge of lightguide stack up. The same LEDs can provide illumination for the backlight and keypad. In conventional solutions separate LEDs for both the backlight and keypad illumination must be used.

The optical structure of the lightguide layer can be designed with variation capabilities concerning its size and the amount of light sources that it incorporates. The optical lightguide design in the first part (light incoupling part) of the lightguide structure can be optimized in such a manner that the light from a point source, such as an LED, may be diffused at different conical angles or directed partially at the same angle, in order to achieve more uniform and/or directed light distribution in the first part. The optical design of the lightguide is not dependent on an exact light source placement. This type of optical design allows the use of different numbers of light sources, having a minimum quantity of light sources and a maximum quantity of light sources on the same edge in order to achieve higher and lower brightness with same uniformity performance. This type of optic surface relief structure may be placed on the top and the bottom surface of the first part of lightguide layer, having diffractive or refractive grooves.

The outcoupling structure may be optimised a manner that it can allow cutting and using the same lightguide design in different sizes in order achieve the same uniformity performance. This can make a lightguide solution more variable and flexible to utilize it in different solutions and applications, without the need to design many lightguide elements, which may have only slight differences in brightness and size requirements.

Conventional known keypad, keyboard and console lighting typically includes 3-8 LEDs and a thick lightguide having holes for each keys or buttons in order to make electrical contact. Such designs include electric circuitry with the help of dome sheet that includes plurality of thin metal domes, one per each key or button. When pushing the key or the button, the thin metal dome on the sheet is bent and flattened making electrical contact, for example, on the surface of electric circuitry. The dome also provides touch feeling with a click effect. The holes are needed to make such designs function. However, these holes make it difficult to manage light in order to achieve uniform keypad lighting.

On the other hand, an ultra thin lightguide layer according to the present invention can be used in keypad lighting, having a thickness of about 50 to about 200 microns, which provides a good flexible and touch sensitive performance, while retaining a click effect. As a result, the lightguide layer can be used without any holes for the keys and buttons. This makes light management easy in order to achieve uniform keypad lighting. Also, less LED components are needed, because the light can be outcoupled more efficiently. This lightguide layer can be placed between buttons and dome sheet and it requires much less space than conventional lightguide.

The dome sheet can be adapted/integrated on the lightguide element in order to decrease amount of components required in a keyboard or keypad. Along these lines, electrical contacts and/or circuitries can be proivded on one or more lightguide layers making up a lightguide element. These contacts and circuitries may be provided utilizing the latest lamination and printing processes. For example, a roll-to-roll process may be utilized. In addition, optic surface relief structures may adapted/integrated on a keypad or keyboard component, or it can be laminated on the top of a printed circuit board. The buttons and keys may be diffusing collimated light for larger illumination angle.

FIG. 1a illustrates a conventional lightguide 2a with an optical surface relief structure 3a on at least one side of the whole surface for the light outcoupling. The conventional thin lightguide solution has an even thickness of about 0.8 mm with the LED 1a at the same height.

Figure 1B:
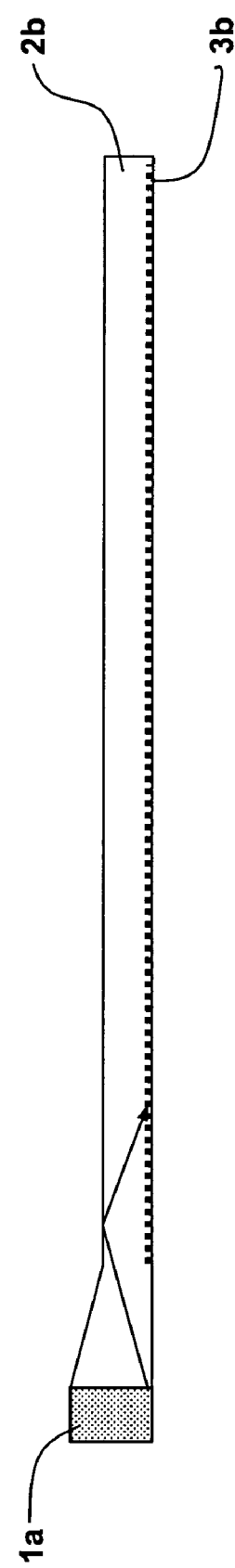

FIG. 1b illustrates a conventional lightguide 2b with an optical surface relief structure 3b at least on one side of the whole surface for the light outcoupling. The conventional thin lightguide solution has a thickness of about 0.6 mm with a light incoupling wedge for the higher LED 1a.

FIG. 2a illustrates an embodiment of an ultra thin lightguide element 2c according to the present invention with an optical surface relief structure 3c on one side of the whole surface for the light outcoupling. The lightguide element includes one lightguide layer. This ultra thin lightguide solution has a substantially even thickness typically about 0.25 to about 0.4 mm with the LED 1b at the same height.

FIG. 2b illustrates another embodiment of an ultra thin lightguide element 2d according to the present invention that includes an optical surface relief structure 3d on both side of the whole surface for the light outcoupling. This embodiment of an ultra thin lightguide has a substantially even thickness, typically about 0.25 to about 0.4 mm with the LED 1b at the same height.

FIG. 2c illustrates another embodiment of an ultra thin lightguide element 2e according to the present invention that includes an optical surface relief structure 3e on one side of the surface for the discrete light outcoupling. This ultra thin lightguide solution has a substantially even thickness, typically about 0.25 to about 0.4 mm with the LED 1b at the same height. This is a suitable solution for the keypad or keyboard lighting.

Figure 3:
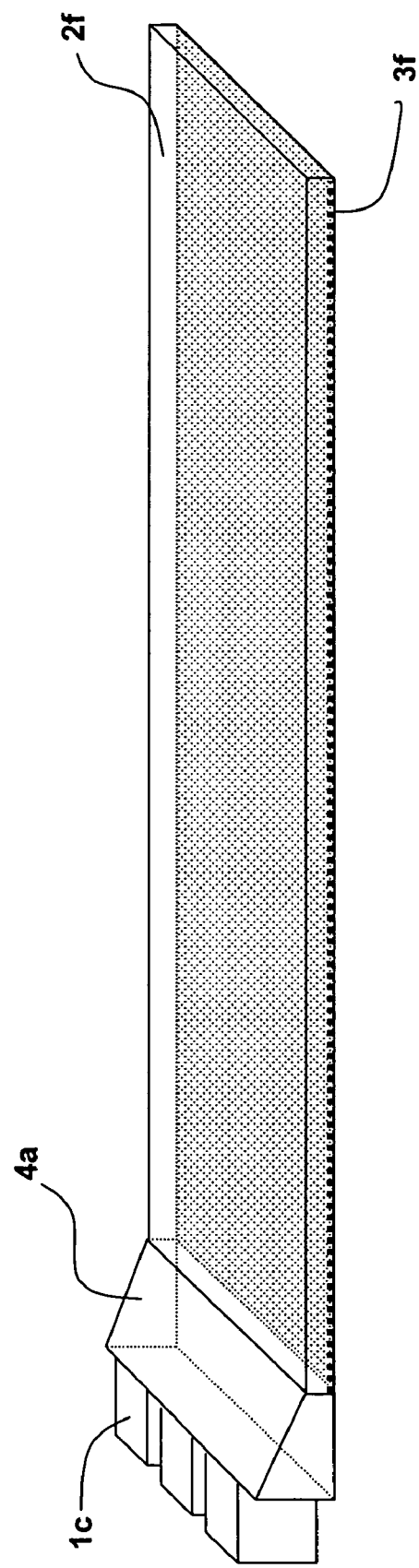
FIG. 3 represents an illustration showing a perspective view of an embodiment of an ultrathin lighting element according to the present invention.

FIG. 3 illustrates another embodiment of an ultra thin lightguide element 2f according to the present invention that includes an optical surface relief structure 3f on at least one side of the whole surface for the light outcoupling. This ultra thin lightguide solution has a substantially even thickness, typically about 0.25 to about 0.4 mm with an optical wedge type adapter 4a for better light incoupling into the lightguide. Along these lines, the LED 1c may have a height of about 0.8 mm, while the lightguide element may have a thickness of about 0.2 mm. This embodiment of an incoupling structure may include specular reflectors on the top and bottom, which can prevent any light loss and to improve incoupling efficiency.

Figure 4A:
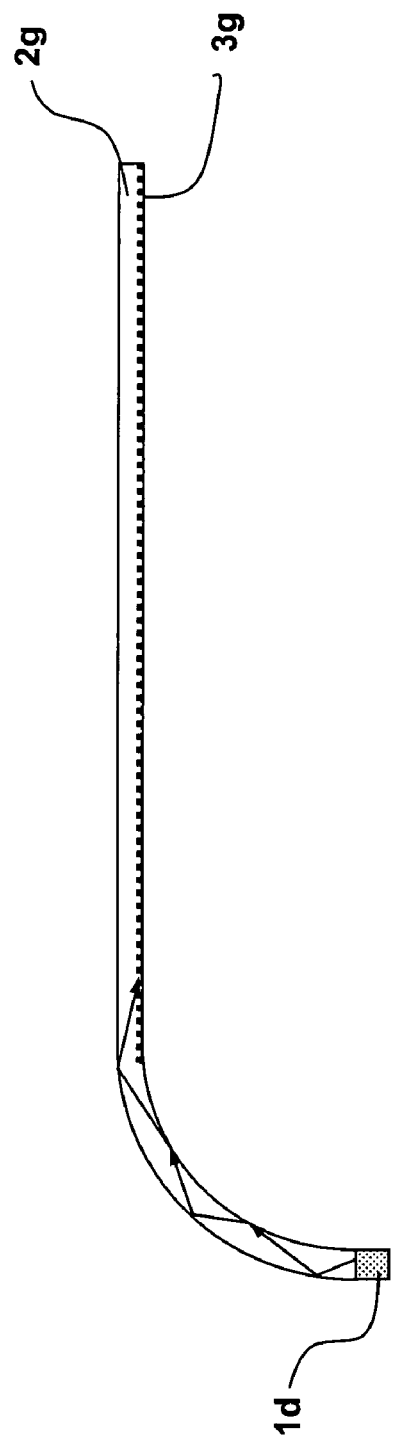
FIGS. 4a and 4b represent illustrations showing cross-sectional views of embodiments of an ultrathin lighting elements according to the present invention including curved lightguide elements.

FIG. 4a illustrates an embodiment of a curved ultra thin lightguide element 2g according to the present invention that includes an optical surface relief structure 3g on at least one side of the surface for light outcoupling. This embodiment of an ultra thin lightguide can be flexible and curved into a preferred form in order to fulfill the total reflection theory, and does not exceed the total reflection angle. This ultra thin lightguide solution can utilize top view LEDs 1d.

Figure 4B:
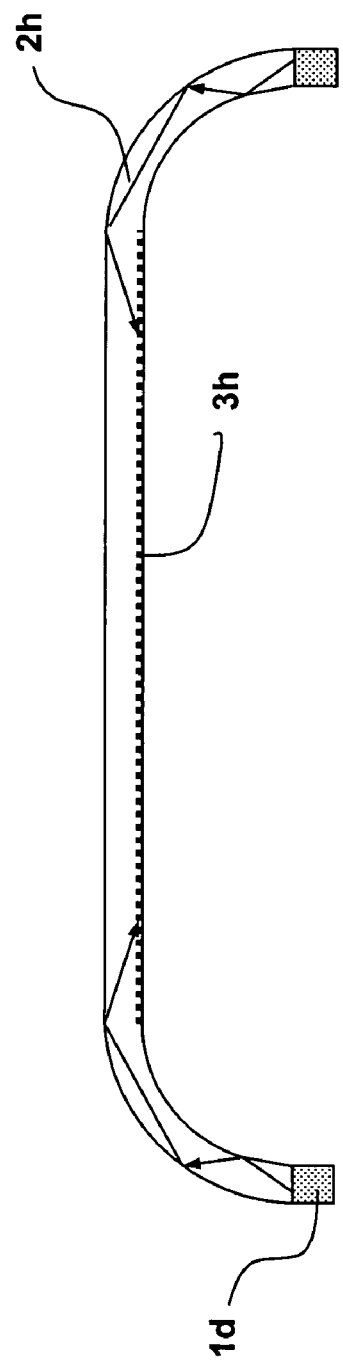

FIG. 4b illustrates an embodiment of a double curved ultra thin lightguide element 2h according to the present invention with an optical surface relief structure 3h on at least one side of the surface for light outcoupling. This ultra thin lightguide can be flexible and curved into a preferred form in order to fulfill total reflection theory, and does not exceed the total reflection angle. This ultra thin lightguide solution may include at least two light incoupling surfaces utilizing top view LEDs 1d.

Figure 5A:
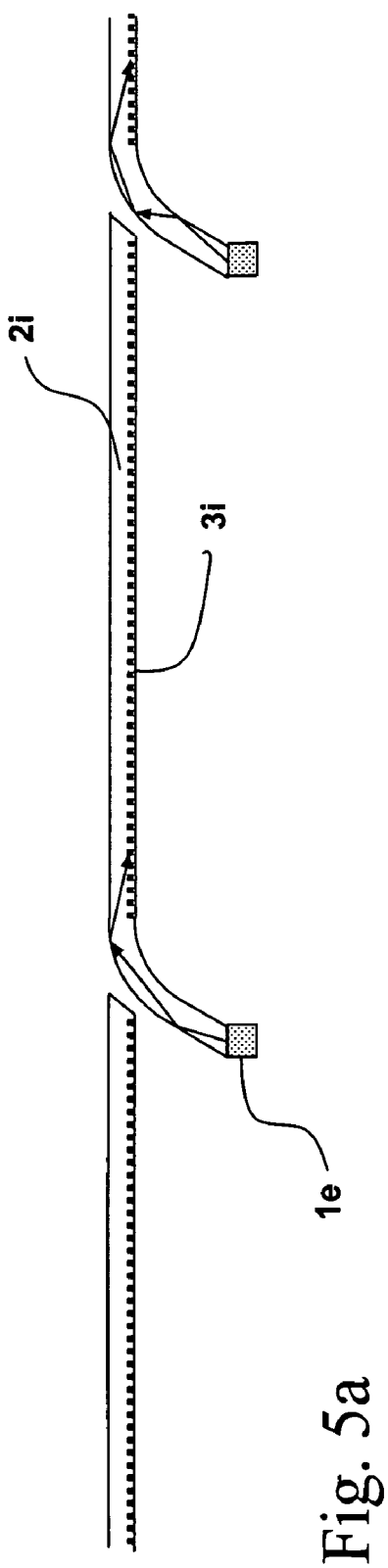
FIG. 5a represents an illustration showing a cross-sectional view of an embodiment of a lighting element according to the present invention that includes a matrix including a plurality of lighting elements.

FIG. 5a illustrates an embodiment of an ultra thin flexible lightguide element 2i according to the present invention including an arrangement for a larger matrix solution with an optical surface relief structure 3i on at least one side of the surface the light outcoupling. This matrix includes several lightguide modules in order to form larger illuminated active area in at least one direction. This application may be suitable backlight solution for a flat display, such as an LCD TV. This solution may include top view LEDs 1e as a light source. Of course, other light sources could be utilized and/or alternatively arranged, as may the lightguide elements be alternatively arranged.

Figure 5B:
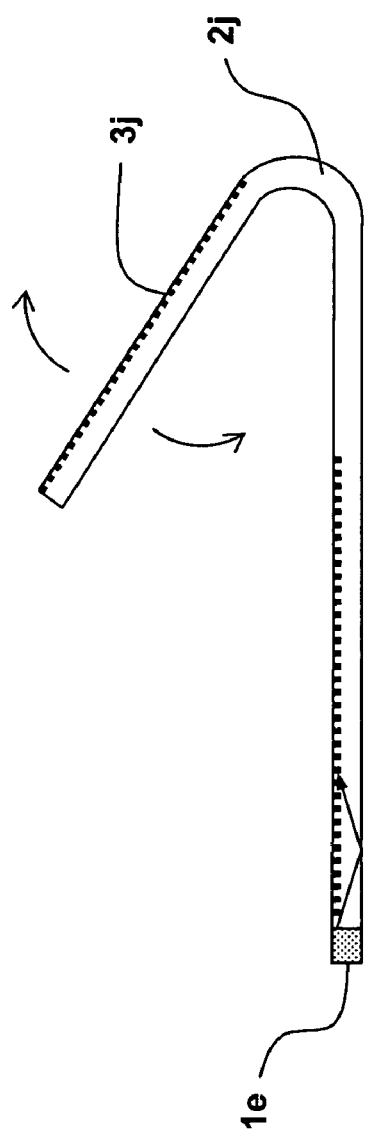
FIG. 5b represents an illustration showing a cross-sectional view of an embodiment of a lighting elements according to the present invention including a bendable lightguide element.

FIG. 5b illustrates an embodiment of a flexible ultra thin lightguide element 2j according to the present invention having two separate optical surface relief structures 3j at least a portion of two different surfaces of the lightguide layer for light outcoupling. This ultra thin lightguide is flexible and can be bent into a desired form. Typically, the bending is carried out in order to fulfill total reflection theory and does not exceed the total reflection angle. This embodiment of an ultra thin lightguide solution can utilize, for example top view LEDs 1d.

Figure 6A:
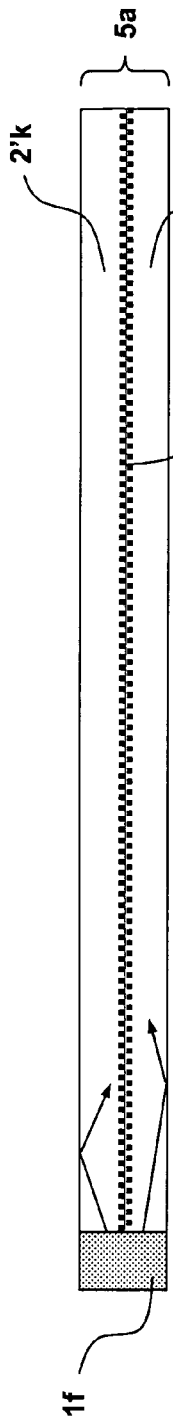
FIGS. 6a, 6b, 6c, and 6d represent illustrations showing cross-sectional views of embodiments of lighting elements according to the present invention that include lightguide elements including two lightguide layers.

FIG. 6a illustrates an embodiment of a multi-layer lightguide element stack up Sa that is based on two lightguide layers 2'k and 2"k with an optical surface relief structure 3k on one side of both layers on the whole surface for the light outcoupling. This lightguide solution has substantially even thickness typically about 0.4 to about 0.8 mm with the LED 1f at the same height.

Figure 6B:
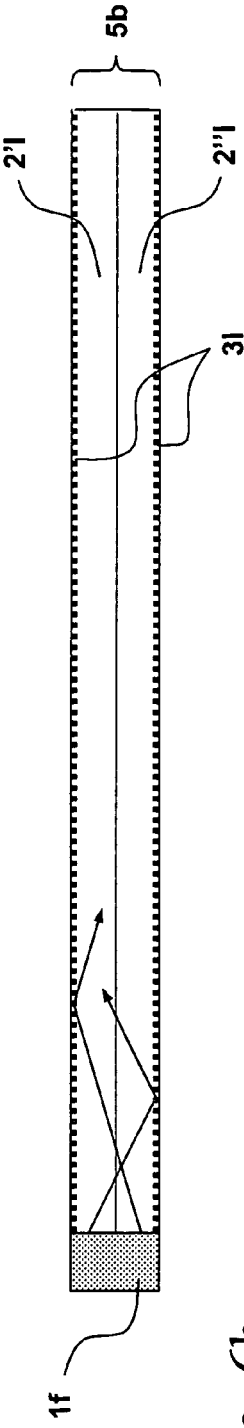

FIG. 6b illustrates another embodiment of a multi-layer lightguide element stack up 5b that includes two lightguide layers 2' and 2" with an optical surface relief structure 31 on one side of both layer on the whole surface for the light outcoupling. This lightguide solution has a substantially even thickness typically about 0.4 to about 0.8 mm with the LED if at the same height.

Figure 6C:
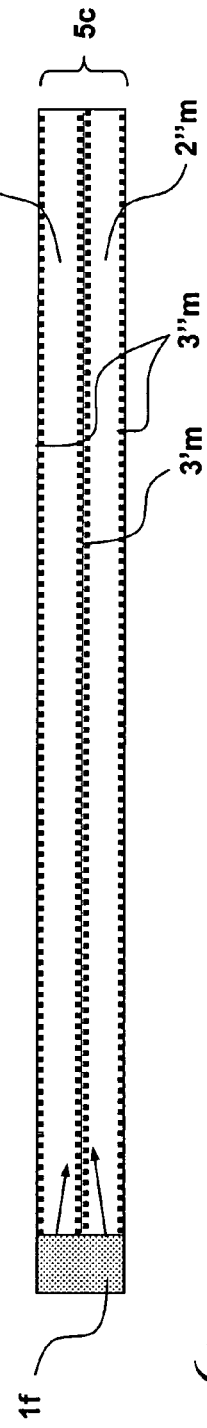

FIG. 6c illustrates an embodiment of a multi-layer lightguide element stack up 5c that is based on two lightguide layers 2'm and 2"m with an optical surface relief structure 3'm and 3"m on both sides of both layers on the whole surface for the light outcoupling. This lightguide solution has a substantially uniform thickness typically about 0.4 to about 0.8 mm with the LED If at the same height.

Figure 6D:
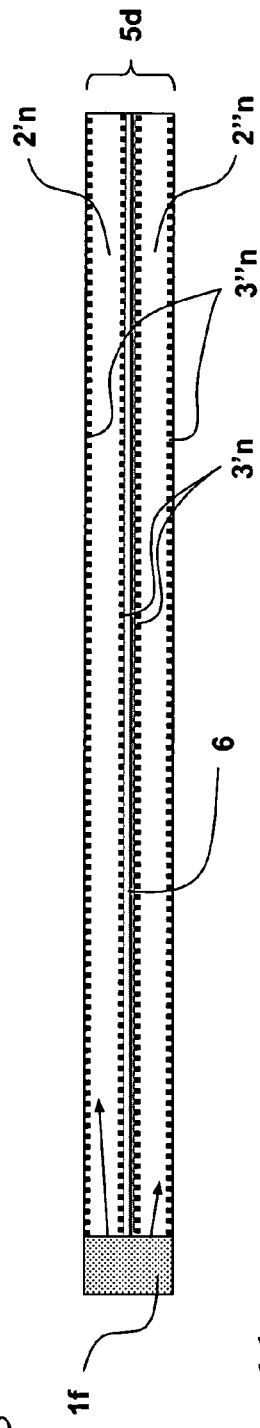

FIG. 6d illustrates an embodiment of a multi-layer dual lightguide element stack up 5d that includes two lightguide layers 2'k and 2"k with an optical surface relief structure 3k on both side of both layers on the whole surface for the light outcoupling. Between the lightguide layers is placed one reflector film 6. This lightguide solution has a substantially uniform thickness typically about 0.4 to about 0.8 mm with the LED 1f at the same height.

Figure 7A:
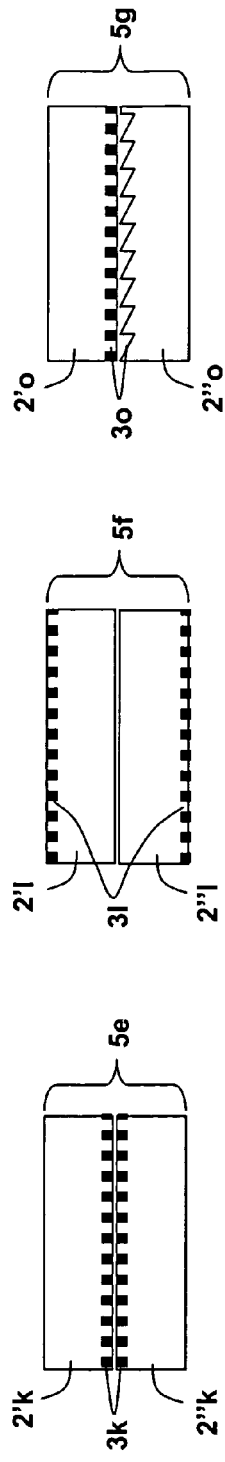
FIGS. 7a, 7b, and 7c represent illustrations showing cross-sectional views of embodiments of lighting elements according to the present invention that include lightguide elements including two lightguide layers and including various optical relief structures optionally on various surfaces on various surfaces and optionally various films arranged between the layers.

FIG. 7a illustrates embodiments of the present invention that include different multi-layer lightguide element stack ups 5e, 5f, and 5g that include two lightguide layers 2'k, 2"k, 2'l, 2"l and 2'o, 2"o with an optical surface relief structure 3k, 3l, and 3o on one side of both layers on the whole surface for the light outcoupling. Optical surface relief structure can be diffractive (binary or blaze) or refractive.

Figure 7B:
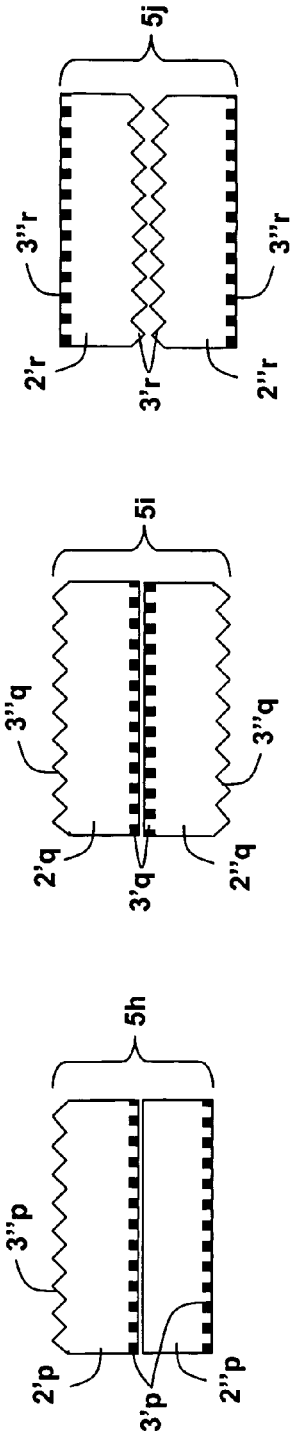

FIG. 7b illustrates embodiments of the present invention that include different multi-layer lightguide element stack ups 5h, 5i, and 5j that are based on two lightguide layers 2'p, 2"p, 2'q, 2"q, and 2'r, 2"r with optical surface relief structures 3'p, 3"p, 3'q, 3"q, and sides of both layer on whole surface for the light outcoupling. Optical surface relief structure can be diffractive (binary or blaze) or refractive.

Figure 7C:
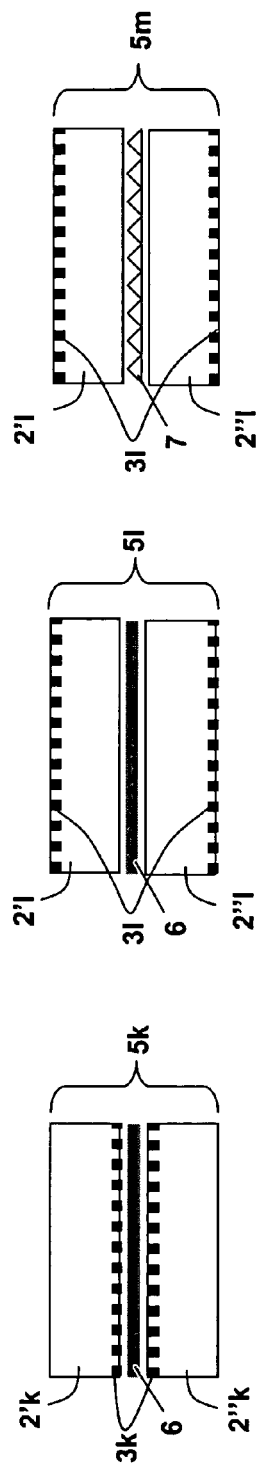

FIG. 7c illustrates embodiments of the present invention that include different multi-layer lightguide element stack ups 5k, 5l, and 5m that include two lightguide layers 2'k, 2"k and 2'l, 2"l with an optical surface relief structure 3k and 3l on one side of both layers on the whole surface for the light outcoupling. Between the lightguide layers is placed one reflector film 6 or another type of optical film as prismatic film 7. The optical surface relief structure can be diffractive (binary or blaze) or refractive.

FIG. 8a illustrates embodiments of a multi-layer dual lightguide element stack up that includes two lightguide layers 2's and 2"s having an optical surface relief structure 3s on one side of both layers on the whole surface for the light outcoupling. Between the lightguide layers is arranged a reflector film 6. The light incoupling and brightness may be controlled by differing thickness of lightguide layer, more thickness=more light, less thickness=less light. This lightguide solution is suitable for dual display backlighting, which has a substantially uniform thickness typically about 0.4 to about 0.8 mm with the LED Ig at the same height.

FIG. 8b illustrates embodiments of the present invention that include a multi-layer lightguide element stack up that includes two lightguide layers 2't and 2"t. The lightguide layers have different cross-sectional areas. Optical surface relief structures 3't and 3"t are provided on one side of both layers for the light outcoupling. As can be seen in FIG. 8b, the relief structures are arranged in different regions on each lightguide layer. For example, the lightguide layer 2't includes a relief structure over most if not all of its surface. On the other hand, the lightguide layer 2"t includes relief structures in isolated regions. This embodiment could be utilized with a mobile phone that includes a display and a keypad. Between the lightguide layers is arranged a reflector film 6. The light incoupling and brightness may be controlled by differing thickness of lightguide layer, more thickness=more light, less thickness=less light. This lightguide solution is suitable for display backlighting and keypad lighting, which has a substantially uniform thickness typically about 0.4 to about 0.8 mm with the LED 1g at the same height.

FIG. 8c illustrates an embodiment of the present invention that includes a multi-layer lightguide element stack up that includes three lightguide layers 2'u, 2"u, and 2"'u with optical surface relief structure 3'u and 3"u on one side of each layer for the light outcoupling. Between the lightguide layers may be arranged reflector films 6. The light incoupling and brightness may be controlled by differing thickness of lightguide layer, more thickness=more light, less thickness=less light. This lightguide solution may be suitable for dual display backlighting and keypad lighting, which may have a substantially uniform thickness typically about 0.4-0.8 mm with the LED 1g at the same height.

FIG. 9a illustrates an embodiment of the present invention that includes a flexible multi-layer dual lightguide element stack up that includes two lightguide layers 2'v and 2"v with optical surface relief structures 3'v and 3"v on at least a portion of a side of both layers for the light outcoupling. Between the lightguide layers may be arranged a reflector film 6. This lightguide solution is flexible and can be bent into a preferred form in order to fulfill total reflection theory and typically does not exceed total reflection angle. The light incoupling and brightness may be controlled by differing thickness of lightguide layer, more thickness=more light, less thickness=less light. This lightguide solution may be suitable for dual display backlighting, such as in a clam shell mobile phone, or flip phone, and may have a substantially uniform thickness, typically about 0.4 to about 0.8 mm with the LED 1h at the same height.

FIG. 9b illustrates an embodiment of the present invention that includes a multi-layer lightguide element stack up that is based on one lightguide layer 2w that includes optical surface relief structures 3w on one side of layer for the light outcoupling. The lightguide layer is folded up in order to form complete lightguide stack up. As can be seen in FIG. 9b, the surface that includes the surface relief structures will contact itself. This illustrates how the present invention can provide a multilayer lightguide element with only one lightguide layer. This lightguide solution can prevent light leakage in the end of lightguide. The thickness is typically about 0.2 to about 0.8 mm with the LED 1i at the same height.

FIG. 9c illustrates an embodiment of the present invention that includes a multi-layer lightguide element stack up that includes one lightguide layer 2w with an optical surface relief structure 3w on one side of layer for the light outcoupling. The lightguide layer may be folded up in order to form complete lightguide stack up. Between the lightguide layers may be arranged a reflector film 6. This lightguide solution can prevent light leakage in the end of lightguide. The thickness may typically be about 0.2 to about 0.8 mm with the LED 1i having substantially the height. The LED may be connected easily to the lightguide edge with specific adapter, where LED is in-molded.

Figure 10A:
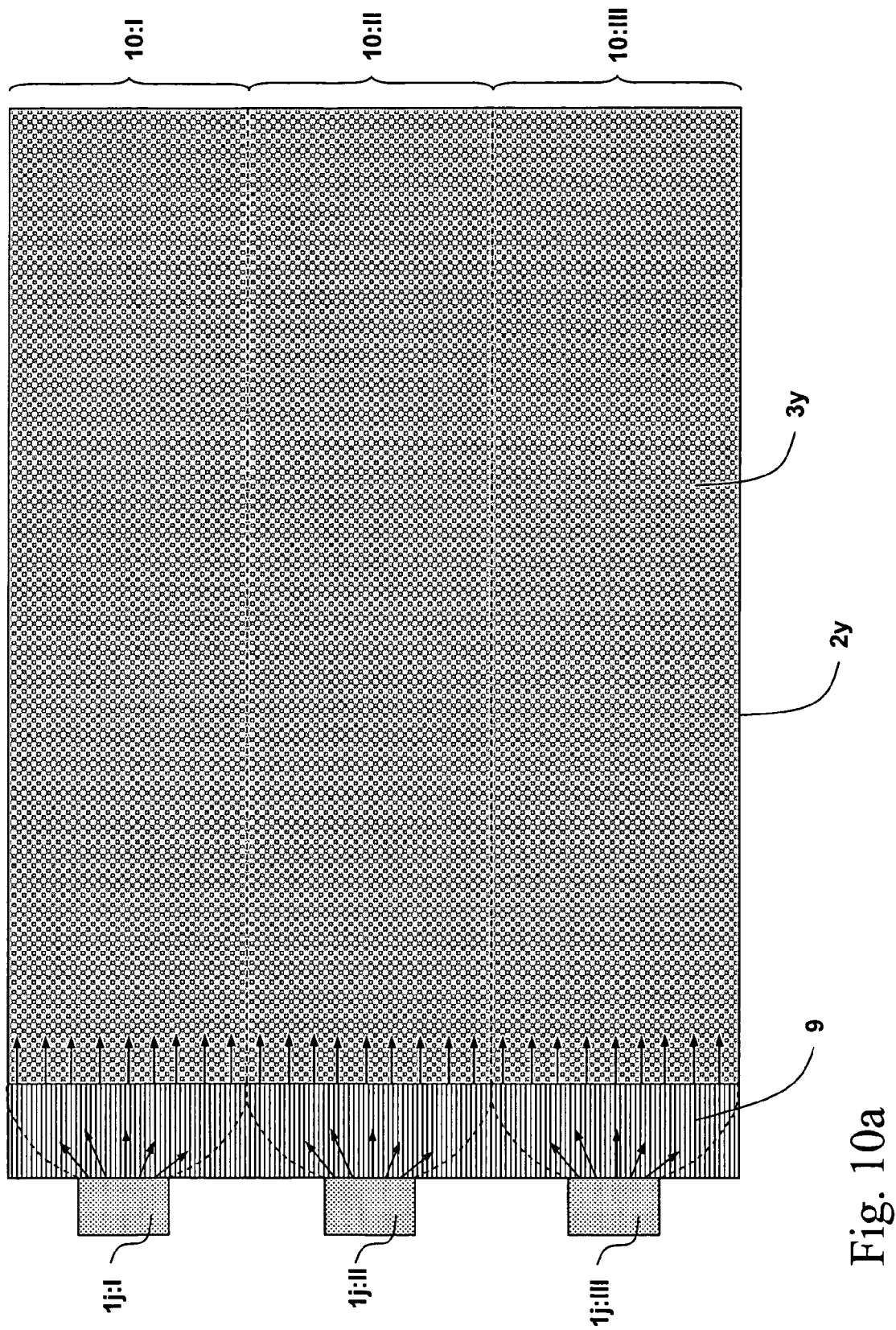
FIGS. 10a and 10b represent illustrations showing overhead views of embodiments of a lighting element according to the present invention.

FIG. 10a illustrates an embodiment of an ultra thin lightguide element 2y that includes an optical surface relief structure 3y on at least one side of the whole surface for the light outcoupling. The optical design 9, in the first part or light incoupling part in the vicinity of the light sources, may be optimized in such a manner that the light from the point source 1j:1, 1j:11, 1j:111 is diffused at different conical angles or directed partially at the same angle, in order to achieve more uniform and/or directed light distribution in the first part and in the whole active area divided for sectors 10:I, 10:II, 10:III per light source. The optic design 9 is placed on the top and the bottom surface of the first part of lightguide layer, having diffractive or refractive grooves. This embodiment of a lightguide element may not be dependent on precise light source placement. This type of optical design can allow the use of different amounts of light sources, while having the minimum quantity of light sources and maximum quantity of light sources on the same edge, in order to achieve higher or lower brightness with the same uniformity performance.

Figure 10B:
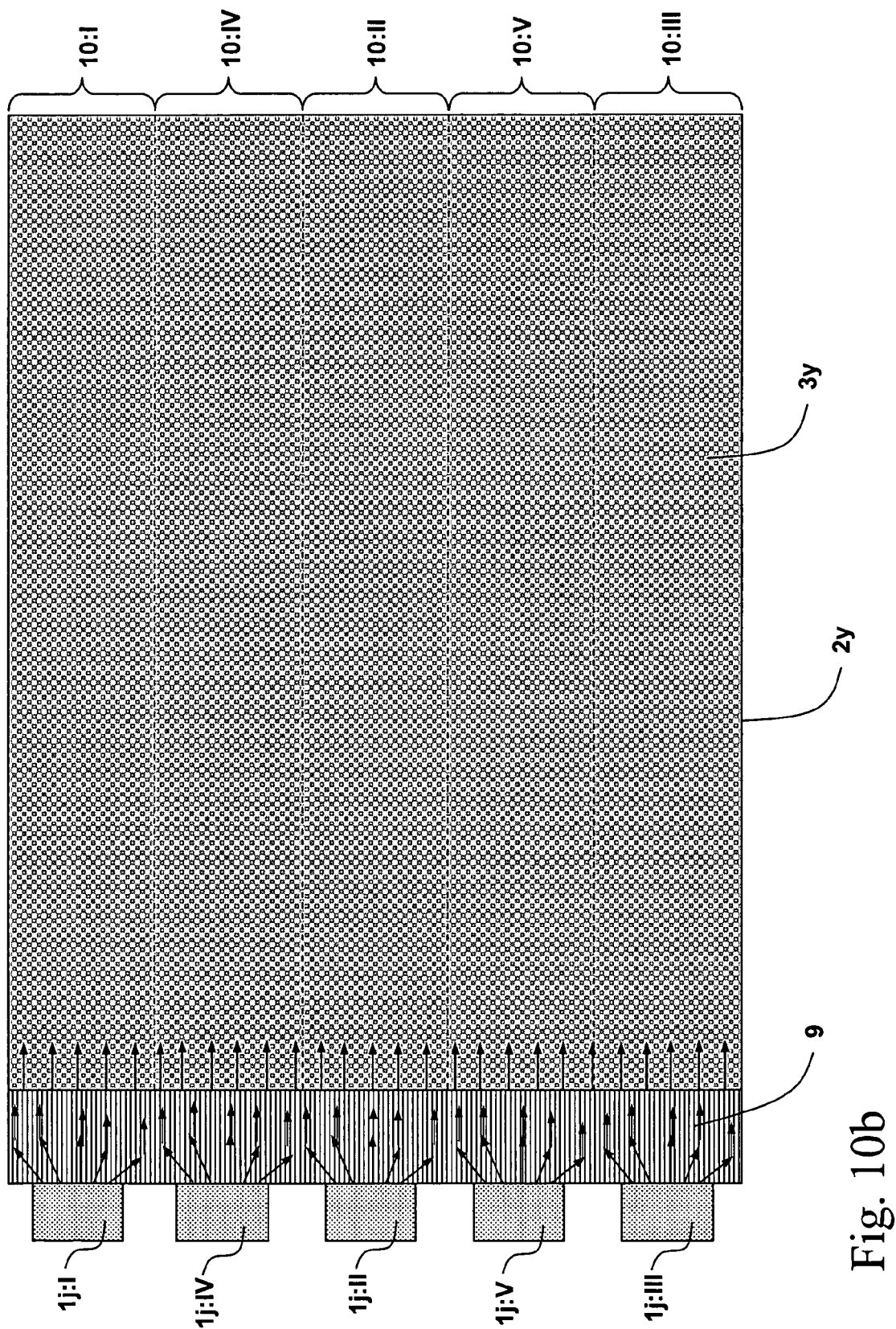

FIG. 10b illustrates an embodiment of an ultra thin lightguide 2y according to the present invention including an optical surface relief structure 3y on at least one side of the whole surface for the light outcoupling. The optical design 9, in the first part or light incoupling part, of the lightguide structure, may be optimized in such a manner that the light from the point source 1*j*:1, 1*j*:11, 1*j*:111, 1*j*:IV, 1*j*:V is diffused at different conical angles or directed partially at the same angle, in order to achieve more uniform and/or directed light distribution in the first part and in the whole active area (divided for sectors 10:I, 10:II, 10:III, 10:IV, 10:V per light source). The optic design 9 may be placed on the top and the bottom surface of the first part of lightguide layer, having diffractive or refractive grooves. This lightguide type may not be dependent on precise light source placement. This type of optical design can allow the use of different amounts of light sources, while having the minimum quantity of light sources and maximum quantity of light sources on the same edge, in order to achieve higher or lower brightness with the same uniformity performance.

Figure 11:
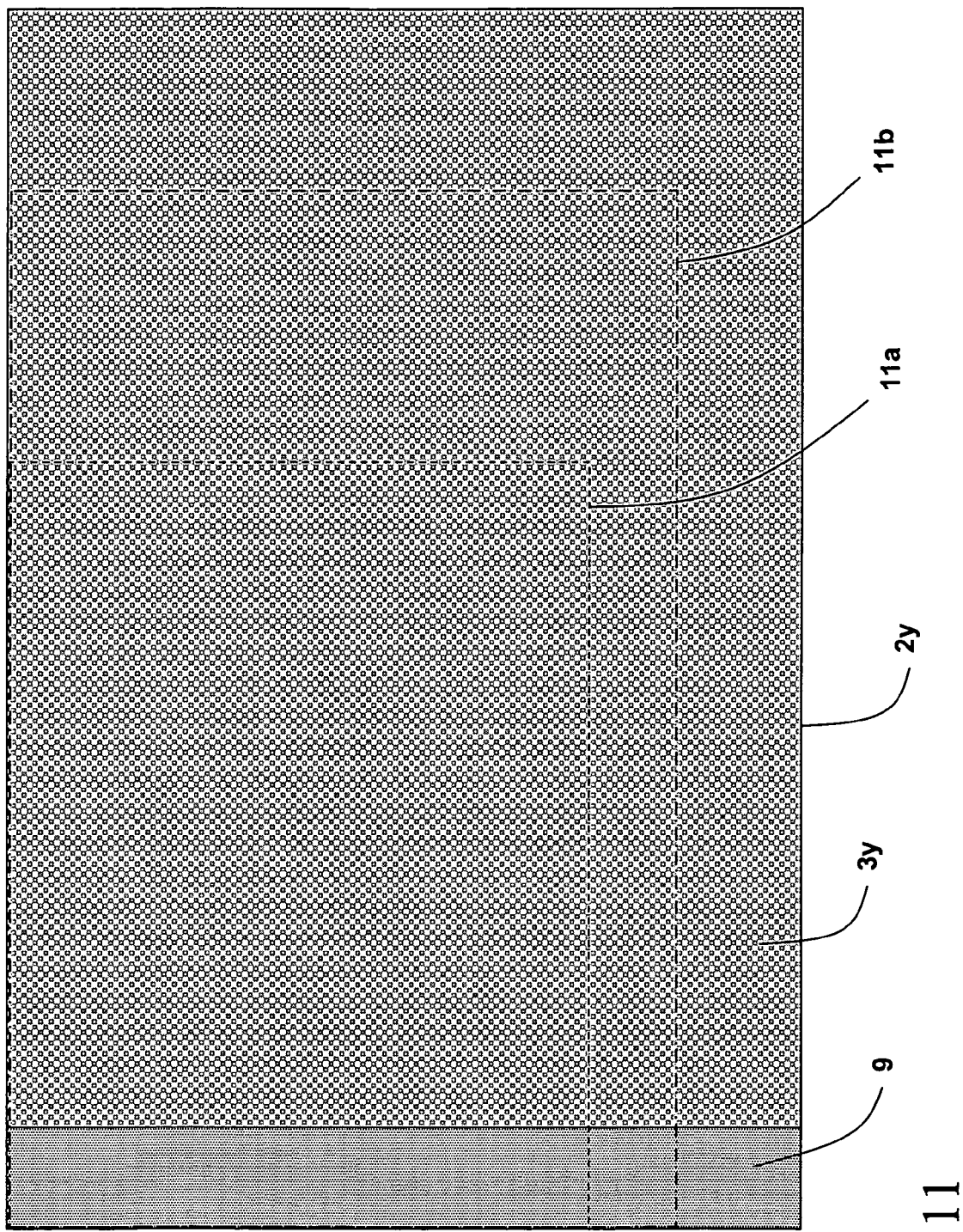
FIG. 11 represents an illustration showing an overhead view of a lighting element according to the present invention illustrating various sizes that the embodiment of the lightguide element.

FIG. 11 illustrates an embodiment of an ultra thin lightguide 2*y* having an optical surface relief structure 3*y* on at least one side of the whole surface for the light outcoupling. The optical outcoupling structure may be optimised with or without light incoupling structure 9, which can allow cutting and using the same lightguide design in different sizes 11*a*, 11*b* in order achieve the same uniformity performance. This can make lightguide solutions more variable and flexible to utilise it in different solutions and applications, without the need to design many lightguides, which have only slight differences in brightness and size requirements.

Figure 12A:
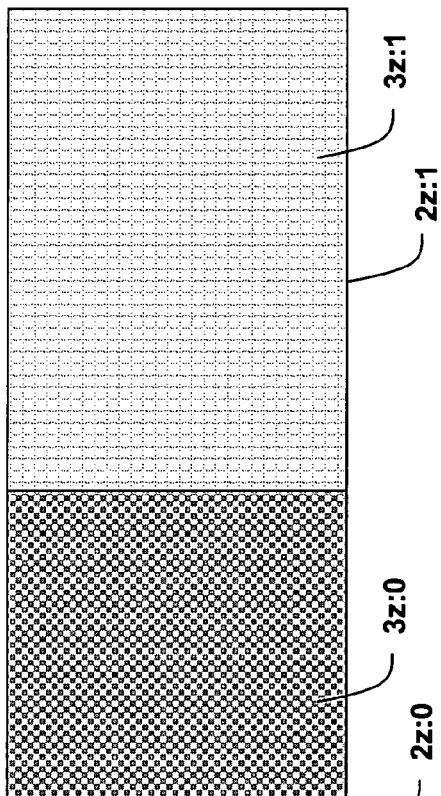
FIGS. 12a, 12b, and 13 represent illustrations showing overhead views of embodiments of lightguide elements according to the present invention that include various patterns of surface relief structures over the lightguide elements.

FIG. 12*a* illustrates an embodiment of an ultra thin lightguide 2*z*:0, 2*z*:1 with different optical surface relief structures 3*z*:0, 3*z*: 1 on at least one side of the whole surface in order to achieve different light performances such as light directing or collimating, diverging, polarizing, among others. The lightguide layer may be folded up in order to form complete lightguide stack up. This solution provides more performances in one package.

Figure 12B:
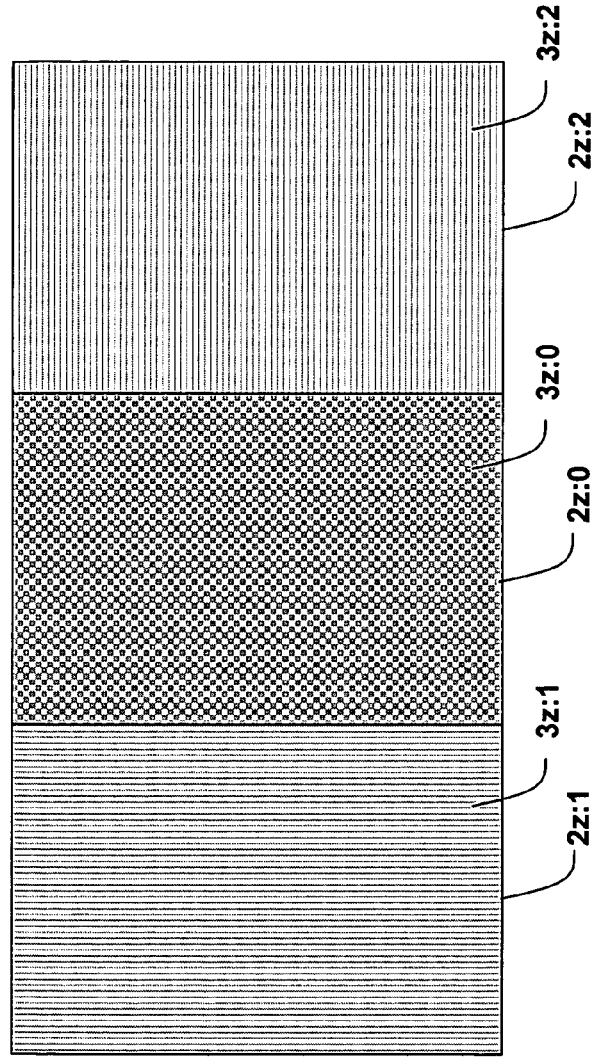

FIG. 12*b* illustrates an embodiment of an ultra thin lightguide element 2*z*:0, 2*z*:1, 2*z*:2 having different optical surface relief structures 3*z*:0, 3*z*:1, 3*z*:2 on at least one side of the whole surface in order to achieve different light performances such as light directing or collimating, diverging, polarizing, among others. The lightguide layer may be folded up in order to form complete lightguide stack up. This solution can provide more performances in one package.

Figure 13:
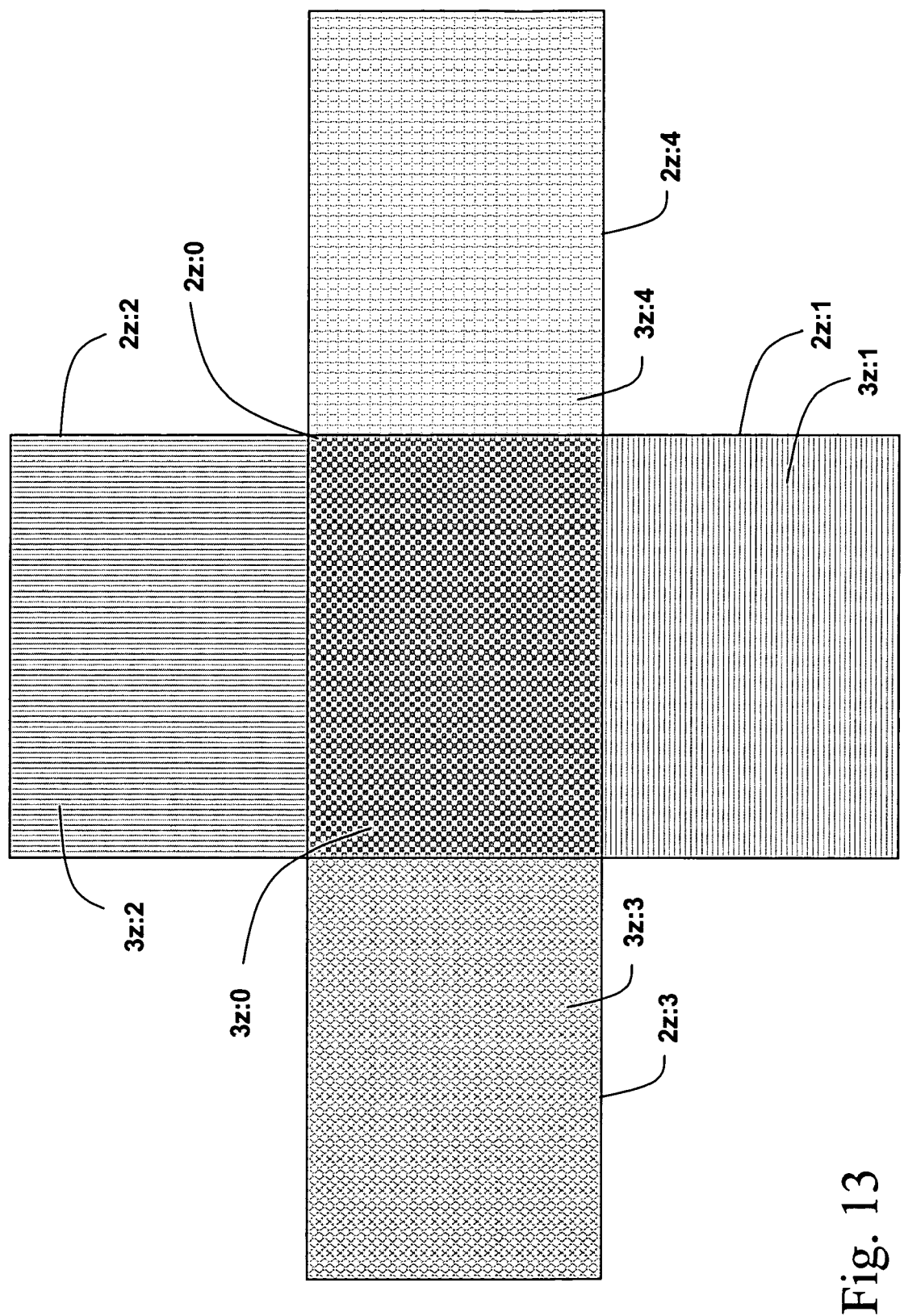

FIG. 13 illustrates an embodiment of an ultra thin lightguide 2*z*:0, 2*z*:1, 2*z*:2, 2*z*:3, 2*z*:4 with different an optical surface relief structures 3*z*:0, 3*z*:1, 3*z*:2, 3*z*:3, 3*z*:4 on at least one side of the whole surface in order to achieve different light performances such as light directing or collimating, diverging, polarizing, among others. The lightguide layer may be folded up in order to form complete lightguide stack up. This solution can provide more performances in one package.

Figure 14:
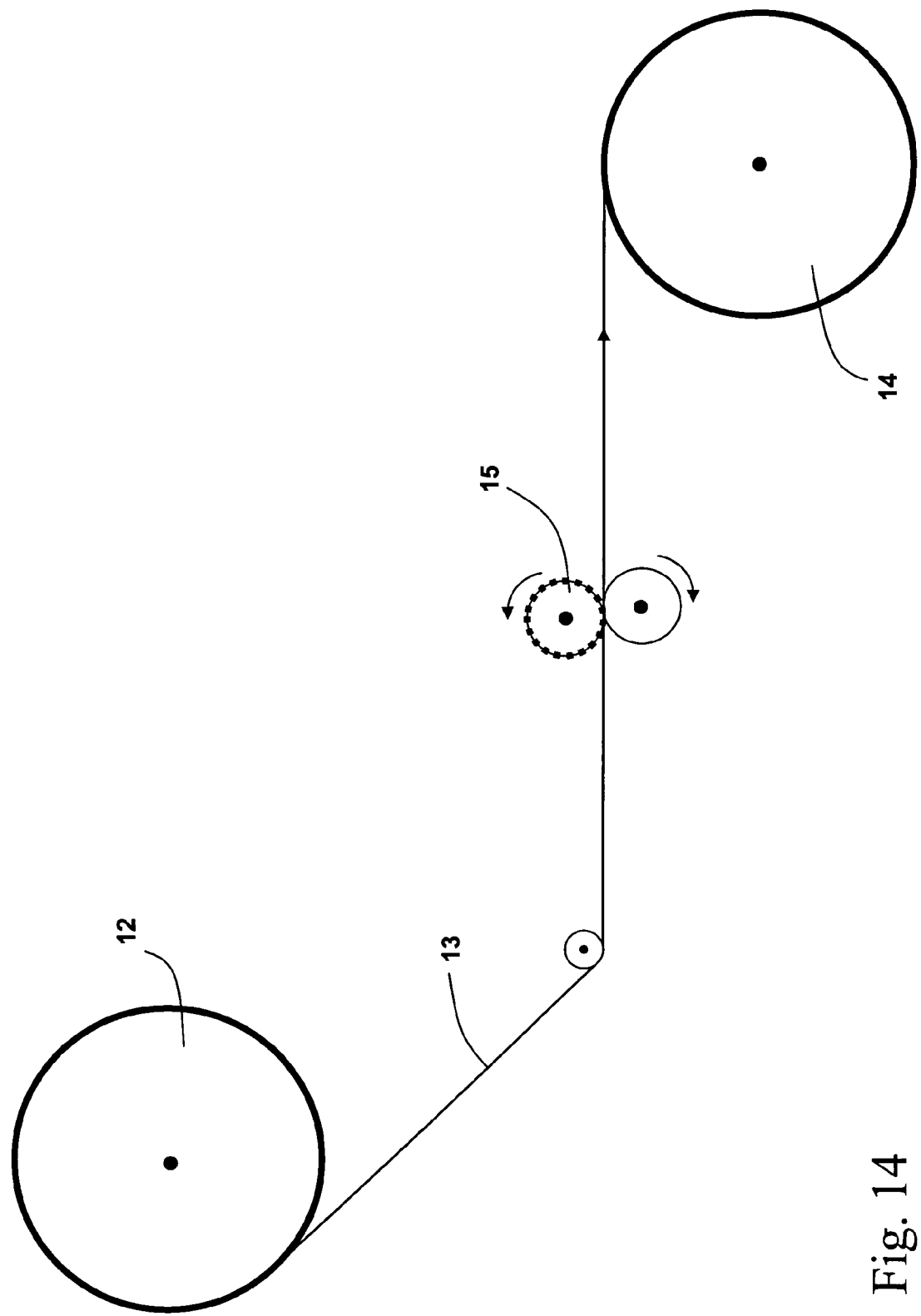
FIGS. 14 and 15 represent illustrations showing cross-sectional views of embodiments for manufacturing lightguide layers according to the present invention utilizing roll-to-roll production.

FIG. 14 illustrates an embodiment of a process for ultra thin lightguide manufacturing by means of continuous roll replication, also known as roll-to-roll. The material moves from roll 12 to roll 14. Using this fast, cost-effective manufacturing method, bulk material 13, such as optically clear plastic film, such as PMMA, PC, or PET, can be replicated with a surface relief replicator 15 such as nickel coated cylinder, drum, roll having an optical surface relief structure.

Figure 15:
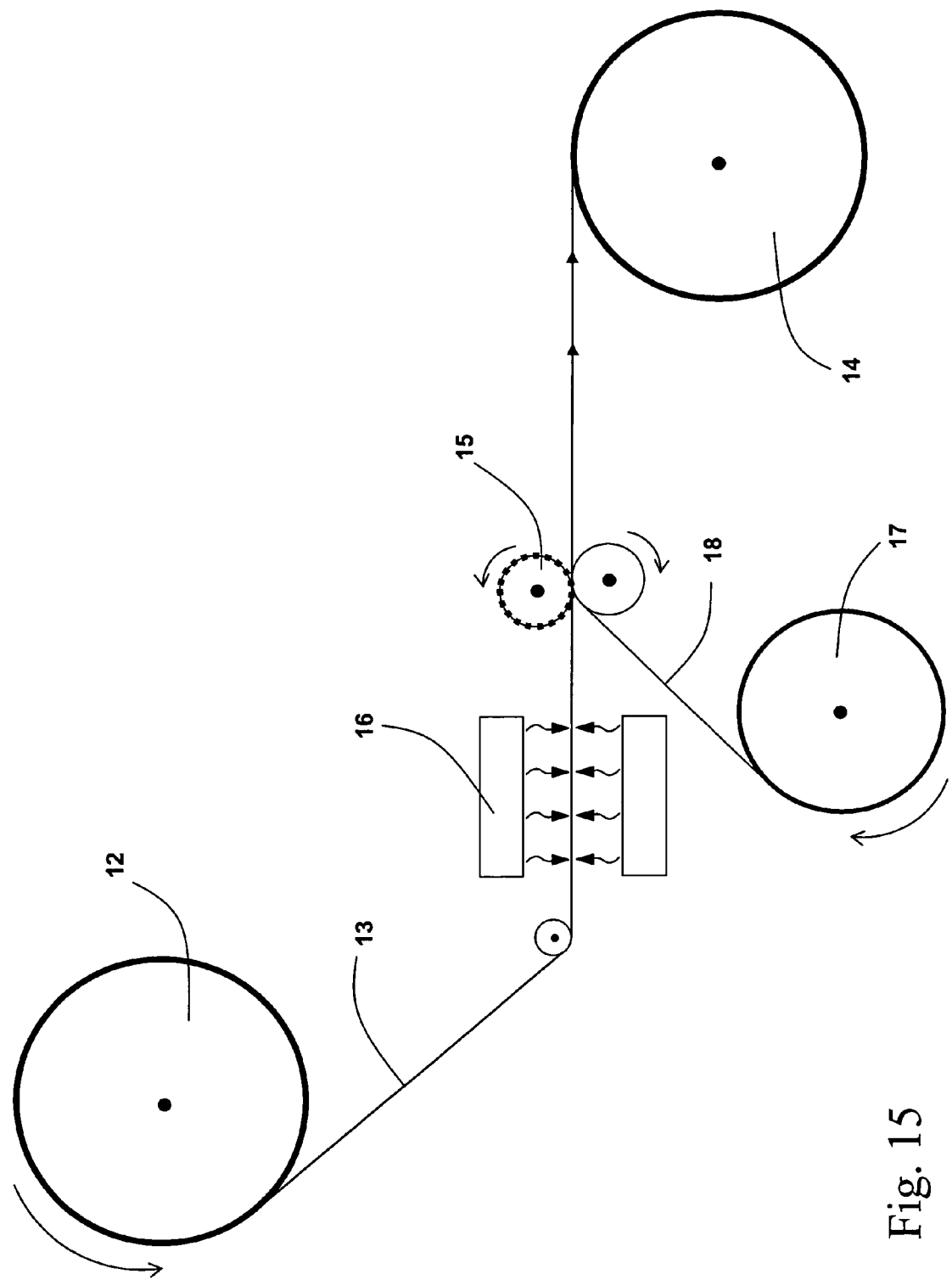

FIG. 15 illustrates another embodiment of a process for ultra thin lightguide manufacturing by means of continuous roll replication, also known as roll-to-roll. The material moves from roll 12 to roll 14. Using this fast, cost-effective manufacturing method, bulk material 13, such as optically clear plastic film, such as PMMA, PC, or PET, can be replicated with a surface relief replicator 15 such as nickel coated cylinder, drum, roll having an optical surface relief structure. Additionally, other functional film 18, such as reflector film, can be laminated onto the surface of lightguide from the roll 17 during the same roll to roll production method. An extra pre-heating 16 may be suitable to utilize to achieve better lamination quality.

Figure 16:
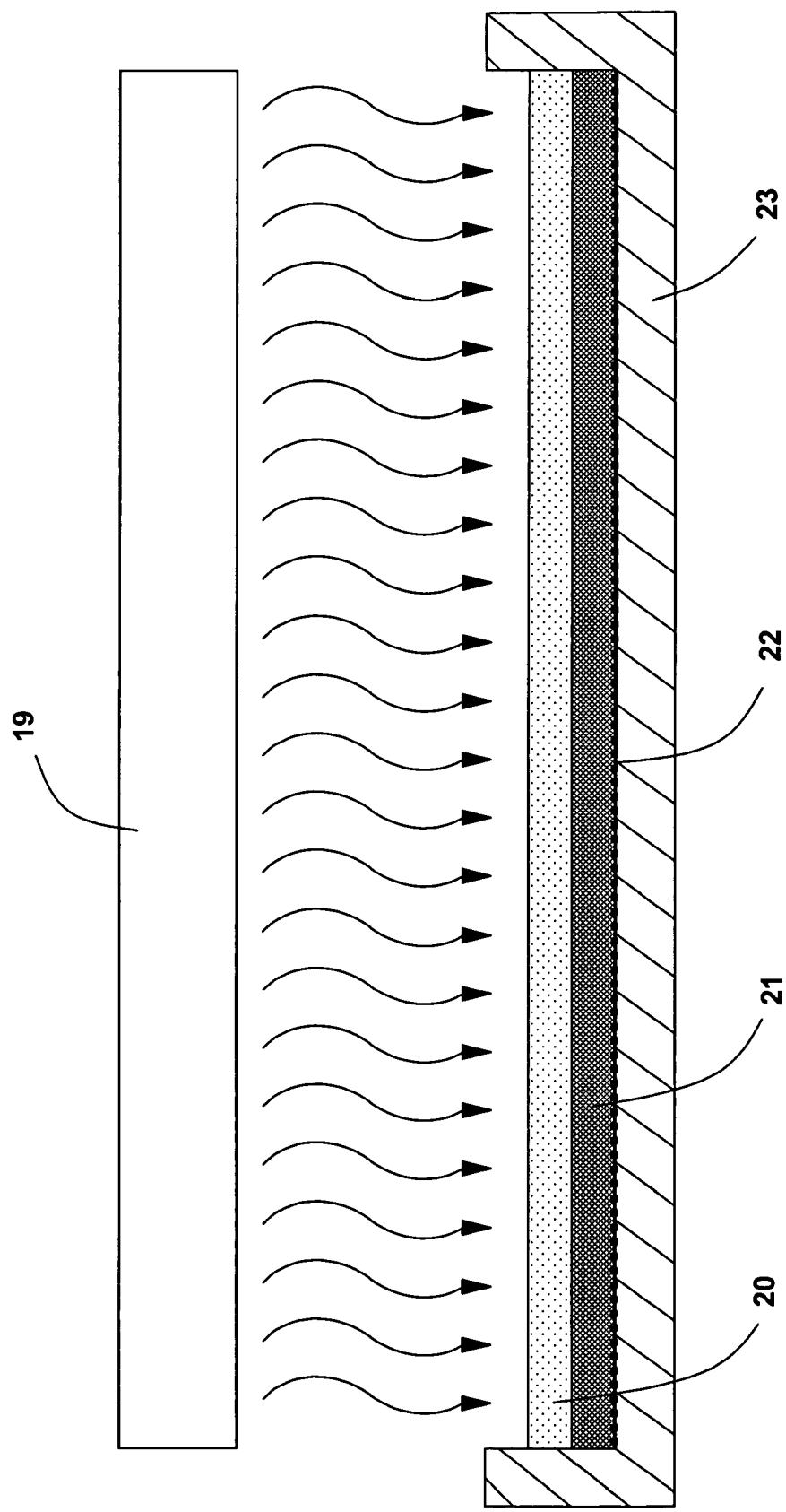
FIG. 16 represents and illustration showing a cross-sectional view of embodiments for manufacturing lightguide layers according to the present invention utilizing ultraviolet (UV) casting.

FIG. 16 illustrates an embodiment of a process for ultra thin lightguide 21 manufacturing by means of UV-casting. Using this fast, cost-effective manufacturing method bulk material 21, such as optically clear plastic resin, can be UV-cured with UV-light source 19 through the top glass 20. An optical surface relief structure may be replicated in a mold 23 with a nickel plate 22 having a surface relief structure.

FIG. 17*a* illustrates an embodiment of a lightguide structures that may be utilized in regions of the lightguide element remote from light source(s). As shown in this exemplary embodiment, the surface relief may include basic structural features, such as grooves and/or recesses arranged in different groups having different sizes, shapes, orientations, configurations. The characteristics of the surface relief may also vary. Along these lines, the filling factor, shape, size, profile, cross-section, and orientation, among other characteristics. The groups may or may not be arranged in repeating patterns. Each group may have any shape, such as a regular or irregular polygon. For example, the groups could be rectangular, triangular, square, trapezpoidal or any other shape. The arrangment of the grooves and/or recesses may vary within each sub-group, within each group, and/or over the entire structure. The characteristics of the grooves and their arrangement may vary be varied to vary the incoupling and/or outcoupling characteristics of the structure. For example, the arrangement could maximize the diffraction efficiency. The arrangement could also make diffraction efficiency is a function of location. In the embodiment shown in FIG. 17*a*, the surface relief structure is arranged in groups 25. Each group includes a plurality of sub-groups 27 that each include basic structural features 26 on the order of about 10 microns or less in height, and on the order of about 10 microns or less in each lateral dimension. Each group and subgroup could have other configurations.

FIG. 17*b* illustrates an embodiment of a lightguide layer in the vicinity of light source(s) according to the present invention. In the embodiment shown in FIG. 17*b*, the surface relief structure is arranged in groups 29 in a regular pattern.

FIG. 17*c* illustrates an embodiment of a lightguide layer in the vicinity of light source(s) according to the present invention. In the embodiment shown in FIG. 17*c*, the surface relief structures are arranged in groups 29 in a non-regular pattern.

Figure 18:
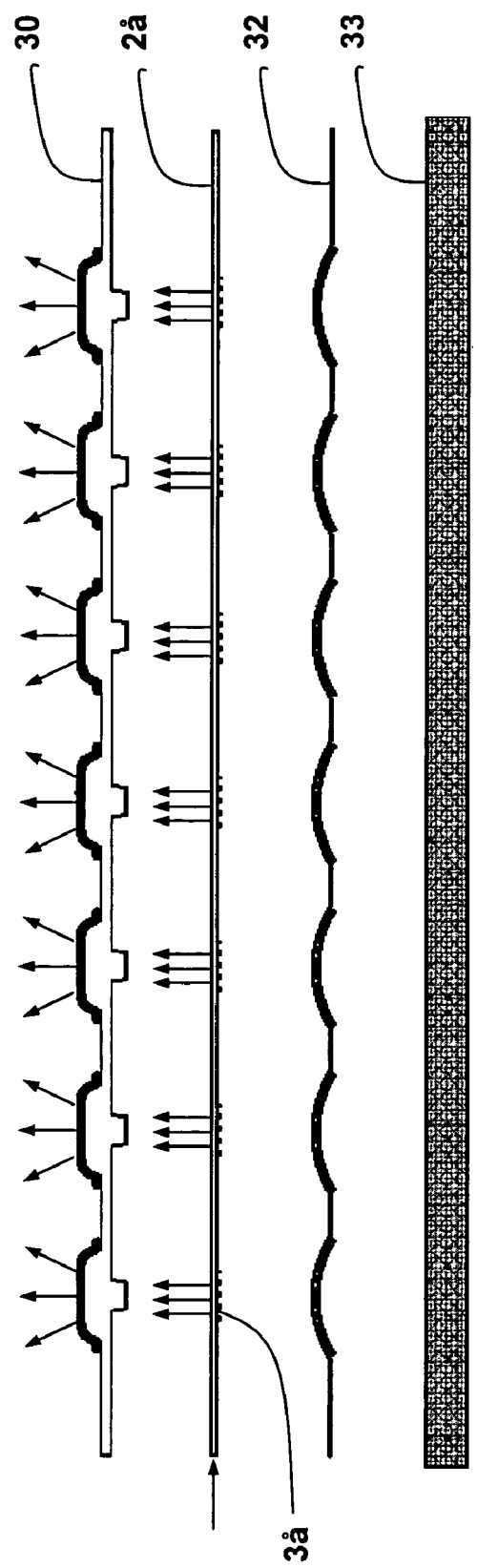
FIG. 18 represents an illustration showing a cross-sectional view of an embodiment of a keypad including a lighting element according to the present invention.

FIG. 18 illustrates an embodiment of an ultra thin lightguide layer 2*a* for keypad lighting. This embodiment of the lightguide element has a thickness of about 50 to about 200 microns, which provides a good flexible and touch sensitive performances retaining a click effect. The lightguide layer is arranged placed between keypad 30 and dome sheet 32 and utilize much less space than a conventional lightguide. Due to the thin and flexible nature of the lightguide layer, the keypad pressing can make electrical contact between dome sheet and the circuit board 33. The discrete optic surface relief structure of light outcoupling 3 å is preferable fine grating structure. The grating structures may be optimized in order to achieve high outcoupling efficiency in 0° angle (collimated light). The keypad is diffusing collimated light for larger illumination angle.

Figure 19A:
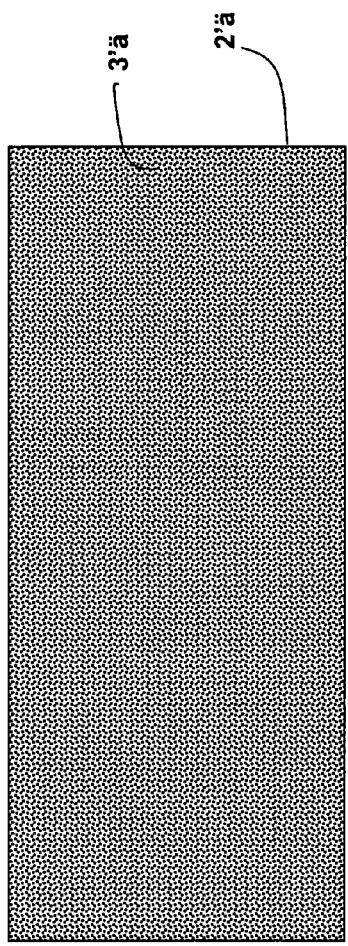
FIGS. 19a, 19b, and 19c represent illustrations showing various embodiments of lightguide layers according to the present invention including surface relief structures arranged in various groupings.

FIG. 19*a* illustrates an embodiment of an ultra thin lightguide layer 2'*ä* for keypad lighting with the fine optic surface relief structures 3'*ä* provided over the whole surface to form a uniform illuminating area.

Figure 19B:
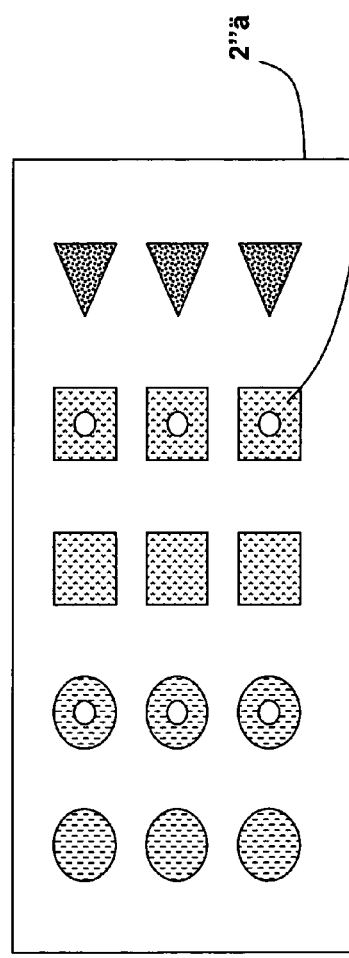

FIG. 19b illustrates an embodiment of an ultra thin lightguide layer 2"ä that may be utilized with for keypad lighting with the discrete fine optic surface relief structures 3"ä forming uniform and discrete illuminating areas.

Figure 19C:
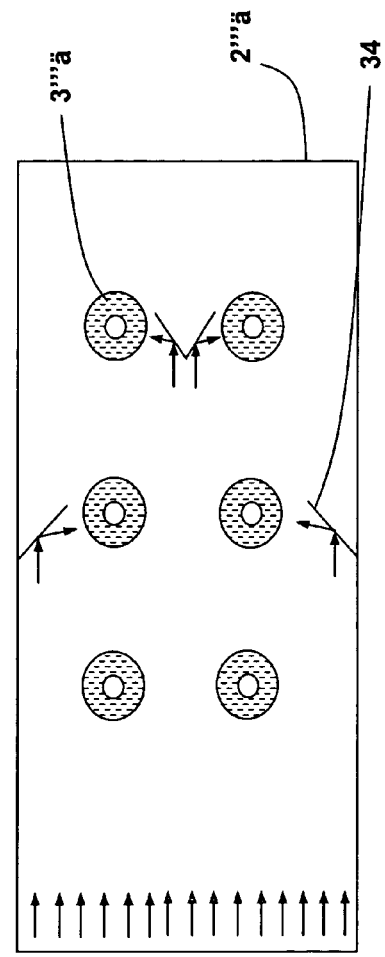

FIG. 19c illustrates an embodiment of an ultra thin lightguide layer 2'''ä for keypad lighting with the fine optic surface relief structures 3'''ä and short boundary surface lines 34 produced by cutting process, which can be reflecting or directing light for the illuminating areas.

FIG. 20a and 20b illustrate, respectively, an overhead view and a side view of an embodiment of a lighting element 2ö with an improved light incoupling using a bundle of split optic fibers 35 between light source 1k and the lightguide layer.

FIG. 21a illustrates embodiment of an ultra thin lightguide element 2'â according to the present invention wherein the surface relief structures are arranged in small discrete outcoupling structure groups 29, wherein a region 36' of the lightguide layer in the vicinity of the at least one longitudinal light source 11 the outcoupling structure groups include about 10% or less of the area of the lightguide layer.

FIG. 21b illustrates embodiment of an ultra thin lightguide element 2"â according to the present invention wherein the surface relief structures are arranged in small discrete outcoupling structure groups 29, wherein a region 36" of the lightguide layer in the vicinity of the at least one point light source 1m, the outcoupling structure groups include about 10% or less of the area of the lightguide layer. The maximum distance D between small discrete outcoupling structure groups is 300 microns or less.

FIG. 22 illustrates embodiment of small portion of ultra thin lightguide layer 2á wherein the basic structural features 26 of surface relief structures is forming a small discrete outcoupling structure group 29.

Figure 23A:
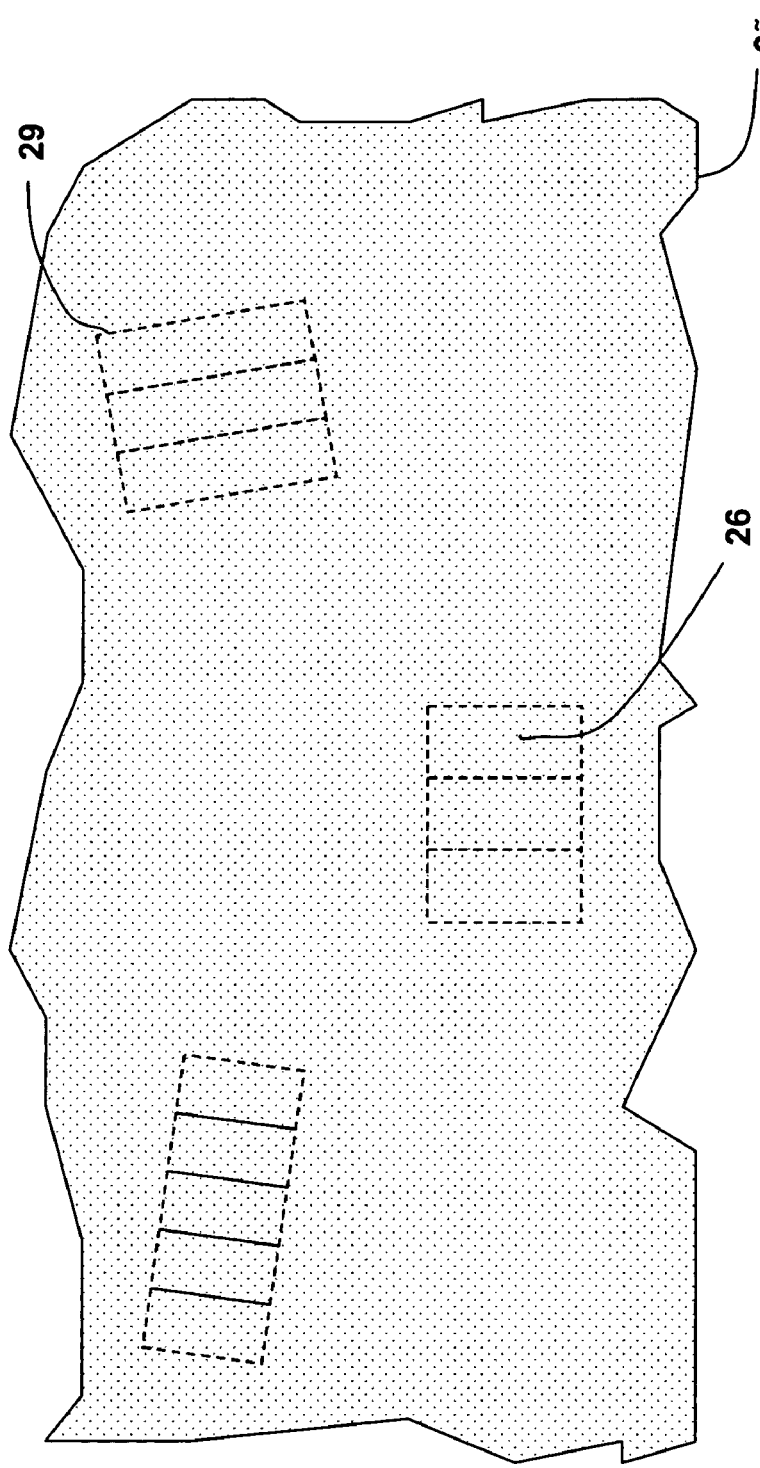
FIGS. 23a and 23b represent illustrations showing an overhead view and a cross-sectional view of an embodiment of a lightguide layer wherein the different basic structural features of surface relief structures are forming small discrete outcoupling structure groups.
Figure 23B:
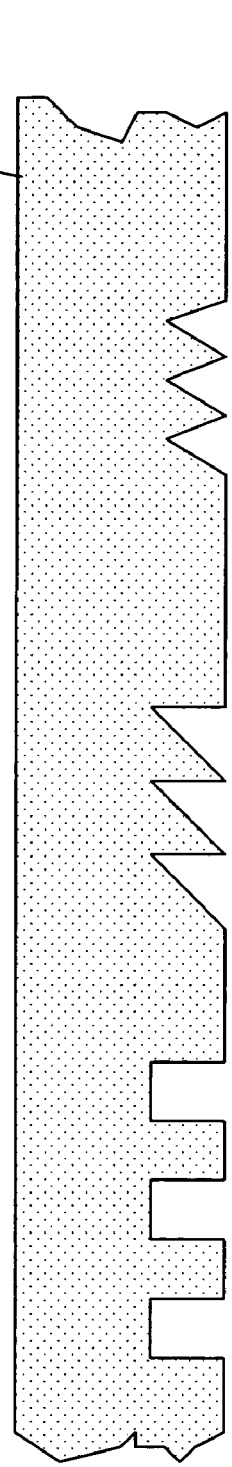

FIG. 23 illustrates embodiment of small portion of ultra thin lightguide layer 2ã wherein the different basic structural features 26 of surface relief structures are forming small discrete outcoupling structure groups 29, wherein the number, arrangement and size of each surface relief structure and height and lateral dimensions of the structural features of the surface relief structures being varied to provide a desired degree of outcoupling modulation of light incoupled into the light guide element.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

I claim:

1. An ultra thin lighting element, comprising:
   at least one light source; and
   a flexible lightguide element comprising one lightguide layer comprising a plurality of discrete groups of fine optic surface relief structures on at least one portion of at least one surface, each discrete group comprising basic structural features on the order of about 10microns or less in height, and on the order of about 10 microns or less in eaeh one lateral dimension, wherein the surface relief structures are arranged in a regular pattern within each discrete group, wherein the at least one light source is arranged at at least one edge of the lightguide element, wherein the lightguide element laterally incouples light from the at least one lightsource into the lightguide element transmits the light through the lightguide element and outcouples light from a surface of the lightguide element, wherein at least a portion of the light is outcoupled from the surface of the lightguide element in a direction perpendicular to the surface of the lightguide element in the vicinity of the outcoupling,
   wherein the number, arrangement and size of each surface relief structure and height and lateral dimensions of the structural features of the surface relief structures being varied to provide a desired degree of outcoupling modulation of light incoupled into the light guide element.

2. The ultra thin lighting element according to claim 1, wherein the surface relief structures are arranged in small discrete outcoupling structure groups, wherein a region of the lightguide layer in the vicinity of the at least one light source the outcoupling structure groups comprise about 10% or less of the area of the lightguide layer.

3. The ultra thin lighting element according to claim 1, wherein at least a portion of the surface relief structures are arranged in a regular pattern.

4. The ultra thin lighting element according to claim 1, wherein at least a portion of the surface relief structures are arranged in an irregular pattern.

5. The ultra thin lighting element according to claim 1, wherein the lightguide element is foldable.

6. The ultra thin lighting element according to claim 1, the lightguide element is curved.

7. The ultra thin lighting element according to claim 1, wherein the lightguide elements comprises a plurality of lightguide layers.

8. The ultra thin lighting element according to claim 7, further comprising:
   at least one film arranged between at least a portion of overlying lightguide layers, the film including at least one of reflector film, diffuser film, prismatic film and brightness enhancement film.

9. The ultra thin lighting element according to claim 7, further comprising:
   a display arranged adjacent at least a portion of at least side of the lightguide element.

10. The ultra thin lighting element according to claim 7, further comprising:
    a keypad.

11. The ultra thin lighting element according to claim 1, wherein the at least one lightguide layer has a thickness of about 0.01 mm to about 0.4 mm.

12. The ultra thin lighting element according to claim 1, wherein the lightguide element has a thickness similar to the height of the light source.

13. The ultra thin lighting element according to claim 1, wherein the lightguide element comprises a plurality of lightguide layers, and wherein not all of the lightguide layers have the same thickness.

14. The ultra thin lighting element according to claim 1, wherein the lightguide element comprises a plurality of lightguide layers, and wherein the number of lightguide layers differs over the lightguide element.

15. The ultra thin lighting element according to claim 1, further comprising:
    an optic relief structure on at least a portion of at least one side of the at least one lightguide layer.

16. The ultra thin lighting element according to claim 1, further comprising:
    an incoupling structure operative to incouple light from the light source into the lighting element, wherein the incoupling structure comprises a wedge comprising specular reflectors on a top and bottom surface, an elliptical light pipe, a focusing lens or a bundle of split optic fibers.

17. The ultra thin lighting element according to claim 16, wherein the light source and the incoupling structure comprise a unitary structure.

18. The ultra thin lighting element according to claim 1, comprising multiple lightguide layers, wherein incoupling varies among the layers.

19. The ultra thin lighting element according to claim 16, wherein the incoupling structure comprises a slanted, a blazed or a radial binary grating structure and diverging lens.

20. The ultra thin lighting element according to claim 1, comprising a plurality of light sources, wherein all light sources are arranged on one edge of the lightguide element.

21. The ultra thin lighting element according to claim 1, wherein light is incoupled into the lightguide element such that it diffuses into the at least one light guide layer at different conical angles.

22. The ultra thin lighting element according to claim 1, further comprising:
a keypad, wherein the at least one light source lights the lightguide element and the keypad.

23. The ultra thin lighting element according to claim 22, wherein the lightguide is continuous over keys and buttons.

24. The ultra thin lighting element according to claim 22, further comprising:
a dome sheet and electric circuitry wherein the at least one light guide overlies substantially the entire dome sheet.

25. The ultra thin lighting element according to claim 24, wherein applying pressure to the at least one light guide layer actuates keys included in the keypad.

26. The ultra thin lighting element according to claim 24, wherein the dome sheet is integrated with the at least one light guide layer.

27. The ultra thin lighting element according to claim 22, wherein electric circuitry is applied to at least one of the at least one lightguide layer.

28. The ultra thin lighting element according to claim 1, further comprising:
a keyboard, wherein the at least one light source lights the lightguide element and the keypad.

29. The ultra thin lighting element according to claim 1, wherein the at least one lightguide layer has a thickness of about 0.25 mm to about 0.4 mm.

30. The ultra thin lighting element according to claim 1, wherein at least a portion of each side of the at least one light guide layer includes surface relief structures.

31. The ultra thin lighting element according to claim 1, wherein at least a portion of the at least one lightguide layer is curved, and wherein an angle of the curve does not exceed a total reflection angle.

32. The ultra thin lighting element according to claim 1, wherein the lightguide element simultaneously outcouples light from two opposite sides.

33. The ultra thin lighting element according to claim 1, wherein a thickness of the lightguide element is substantially uniform over its entire length.

34. The ultra thin lighting element according to claim 1, wherein the at least one lightguide layer comprises surface relief structures on at least a portion of two surfaces.

35. The ultra thin lighting element according to claim 1, wherein the surface relief structures comprise at least one of diffractive and refractive structures.

36. The ultra thin lighting element according to claim 1, wherein the lightguide element comprises two lightguide layers, wherein the two lightguide layers comprise one folded lightguide layer.

37. The ultra thin lighting element according to claim 1, comprising a plurality of
laterally adjacent lightguide elements.

38. An ultra thin lighting element, comprising:
at least one light source; and
a foldable lightguide element comprising one lightguide layer comprising a plurality of discrete groups of fine optic surface relief structures on at least one portion of at least one surface, each discrete group comprising basic structural features on the order of about 10 microns or less in height, and on the order of about 10 microns or less in one lateral dimension, wherein the surface relief structures are arranged in a regular pattern within each discrete group, wherein the at least one light source is arranged at at least one edge of the lightguide element, wherein the lightguide element laterally incouples light from the at least one lightsource into the lightguide element transmits the light through the lightguide element and outcouples light from a surface of the lightguide element, wherein at least a portion of the light is outcoupled from the surface of the lightguide element in a direction perpendicular to the surface of the lightguide element in the vicinity of the outcoupling,
wherein the number, arrangement and size of each surface relief structure and height and lateral dimensions of the structural features of the surface relief structures being varied to provide a desired degree of outcoupling modulation of light incoupled into the light guide element.

* * * * *